United States Patent
Tsubota et al.

(10) Patent No.: US 10,249,058 B2
(45) Date of Patent: Apr. 2, 2019

(54) THREE-DIMENSIONAL INFORMATION RESTORATION DEVICE, THREE-DIMENSIONAL INFORMATION RESTORATION SYSTEM, AND THREE-DIMENSIONAL INFORMATION RESTORATION METHOD

(71) Applicant: PANASONIC INTELLECTUAL PROPERTY MANAGEMENT CO., LTD., Osaka (JP)

(72) Inventors: Kazuhiro Tsubota, Kanagawa (JP); Kenya Uomori, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 15/534,042

(22) PCT Filed: Dec. 14, 2015

(86) PCT No.: PCT/JP2015/006218
§ 371 (c)(1),
(2) Date: Jun. 8, 2017

(87) PCT Pub. No.: WO2016/103621
PCT Pub. Date: Jun. 30, 2016

(65) Prior Publication Data
US 2017/0345184 A1    Nov. 30, 2017

(30) Foreign Application Priority Data

Dec. 24, 2014  (JP) .................................. 2014-261173
Nov. 17, 2015  (JP) .................................. 2015-225110

(51) Int. Cl.
G06T 7/00        (2017.01)
G06T 7/80        (2017.01)
(Continued)

(52) U.S. Cl.
CPC .............. G06T 7/85 (2017.01); G01B 11/245 (2013.01); G01C 11/06 (2013.01); G06K 9/6202 (2013.01);
(Continued)

(58) Field of Classification Search
None
See application file for complete search history.

(56) References Cited

U.S. PATENT DOCUMENTS

2006/0125920 A1*  6/2006  Criminisi .............  H04N 5/0733
                                                     348/159
2011/0026773 A1*  2/2011  Sumitomo .............  G01C 11/06
                                                     382/106

FOREIGN PATENT DOCUMENTS

JP          09-033248         2/1997
JP          09-237341         9/1997
(Continued)

OTHER PUBLICATIONS

Search Report and Written Opinion issued in International Patent Application No. PCT/JP2015/006218, dated Mar. 15, 2016.

*Primary Examiner* — Delomia L Gilliard
(74) *Attorney, Agent, or Firm* — Greenblum & Bernstein, P.L.C.

(57) ABSTRACT

A three-dimensional information reconstraction device includes a corresponding point detector that detects a plurality of corresponding point pairs to which a first feature point included in a first image captured by a first image capturing device and a second feature point included in a second image captured by a second image capturing device correspond, and a three-dimensional coordinate deriver that, based on the plurality of corresponding point pairs, reconstructs three-dimensional coordinates to which the first feature point is inverse-projected.

12 Claims, 30 Drawing Sheets

(51) Int. Cl.
  *G01B 11/245* (2006.01)
  *G06T 7/593* (2017.01)
  *G06K 9/62* (2006.01)
  *G01C 11/06* (2006.01)
  *H04N 13/239* (2018.01)
  *H04N 13/00* (2018.01)

(52) U.S. Cl.
  CPC ........... *G06T 7/593* (2017.01); *H04N 13/239* (2018.05); *G06T 2200/24* (2013.01); *G06T 2207/10028* (2013.01); *G06T 2207/20021* (2013.01); *G06T 2207/30244* (2013.01); *H04N 2013/0074* (2013.01)

(56) References Cited

FOREIGN PATENT DOCUMENTS

| | | | |
|---|---|---|---|
| JP | 2007037011 A | * | 2/2007 |
| JP | 2008-070120 | | 3/2008 |
| JP | 2008-304248 | | 12/2008 |
| JP | 2008304248 A | * | 12/2008 |
| JP | 2012-057960 | | 3/2012 |

* cited by examiner

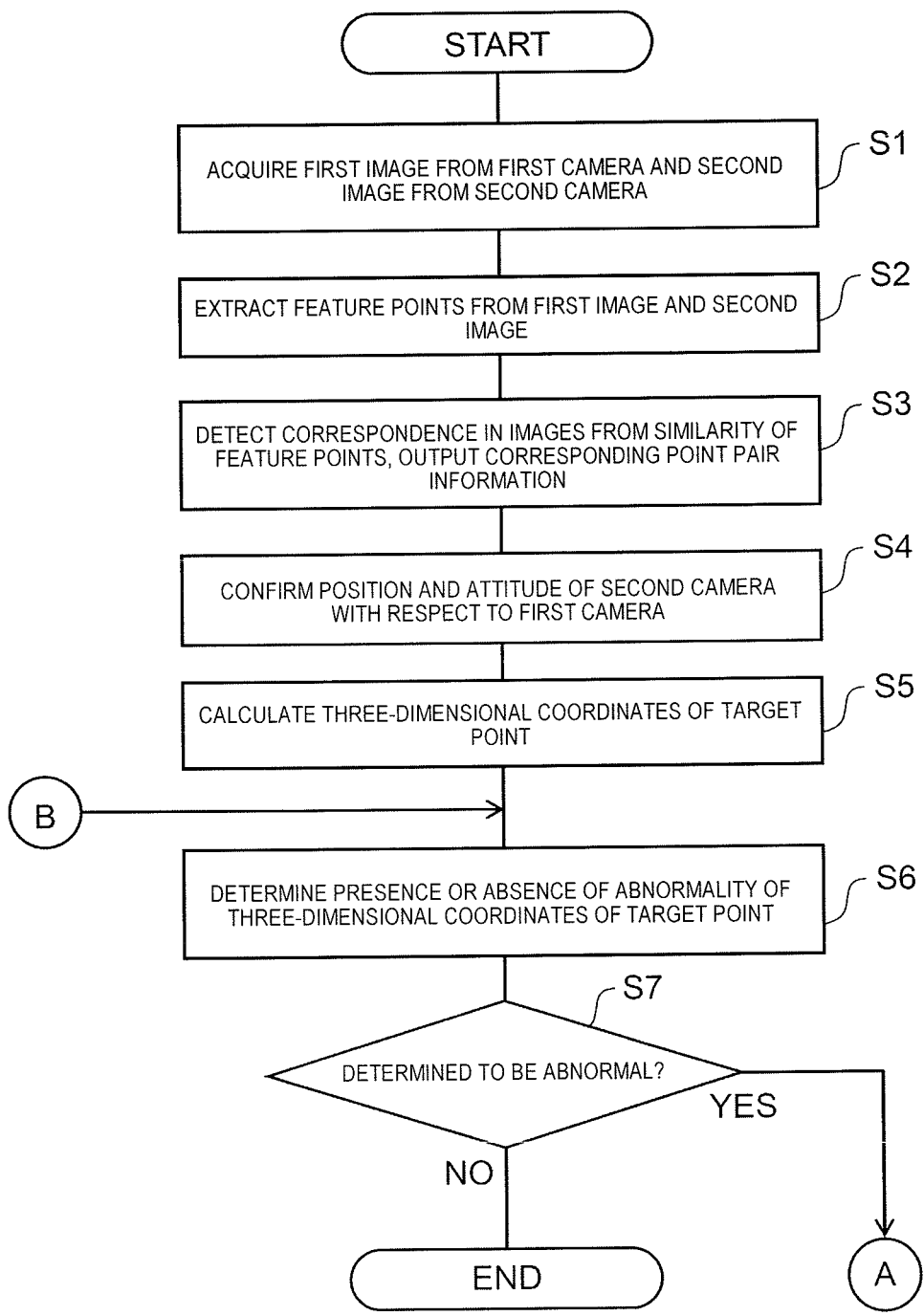

THREE-DIMENSIONAL INFORMATION RESTORATION DEVICE, THREE-DIMENSIONAL INFORMATION RESTORATION SYSTEM, AND THREE-DIMENSIONAL INFORMATION RESTORATION METHOD

TECHNICAL FIELD

The present disclosure relates to a three-dimensional information reconstraction device, a three-dimensional information reconstraction system, and a three-dimensional information reconstraction method.

BACKGROUND ART

Known is a stereocamera in which two image capturers are fixed to one casing to capture the same subject with the left and right image capturers. The stereocamera captures the subject from a plurality of different directions and records plane-direction information and depth-direction information (three-dimensional information).

As a device reconstructing the three-dimensional information, known is a three-dimensional information reconstraction device that includes, for example, an image input, a corresponding point detector, an elementary matrix calculator, a translation calculator, a rotation calculator, and a distance calculator (refer to, for example, PTL 1).

In the three-dimensional information reconstraction device, the image input inputs two images of a captured three-dimensional rigid body. The corresponding point detector detects corresponding points between the two images. The elementary matrix calculator calculates an elementary, matrix from a three-dimensional rotation matrix and a three-dimensional translation vector between the two images. The translation calculator calculates the three-dimensional translation vector. The rotation calculator calculates the three-dimensional rotation matrix. The distance calculator calculates the distance between the camera and the corresponding point in a three-dimensional space.

However, in the case of forming a stereocamera system by individually installing two image capturing devices, the three-dimensional coordinates of a target point may not be correctly restored from left and right images that are respectively captured by the two image capturing devices.

Specifically, for example, the three-dimensional coordinates may not be correctly restored in the case of a small number of corresponding points that represent a positional relationship of corresponding feature points between images of each captured image, or in the case of feature points extracted from each captured image being concentrated in a specific position on the images.

An object of the present disclosure is to improve reconstraction accuracy for three-dimensional coordinates restored from two captured images.

CITATION LIST

Patent Literature

PTL 1: Japanese Patent Unexamined Publication No. 9-237341

SUMMARY OF THE INVENTION

A three-dimensional information reconstraction device of the present disclosure includes a port and a processor, in which the port acquires a first image captured by a first image capturing device and a second image captured by a second image capturing device, and the processor detects a plurality of first corresponding point pairs to which a first feature point in the first image and a second feature point in the second image correspond, and based on the plurality of first corresponding point pairs, reconstructs three-dimensional coordinates to which the first feature point is inverse-projected.

A three-dimensional information reconstraction system of the present disclosure is a three-dimensional information reconstraction system including a first image capturing device that captures a first image, a second image capturing device that captures a second image, and a three-dimensional information reconstraction device that reconstructs three-dimensional coordinates based on the first image and the second image, in which the three-dimensional information reconstraction device includes a port and a processor, the port acquires a first image captured by a first image capturing device and a second image captured by a second image capturing device, and the processor detects a plurality of first corresponding point pairs to which a first feature point in the first image and a second feature point in the second image correspond, and based on the plurality of first corresponding point pairs, reconstructs three-dimensional coordinates to which the first feature point is inverse-projected.

A three-dimensional information reconstraction method of the present disclosure includes a step of acquiring a first image captured by a first image capturing device and a second image captured by a second image capturing device, a step of detecting a plurality of first corresponding point pairs to which a first feature point in the first image and a second feature point in the second image correspond, and a step of, based on the plurality of first corresponding point pairs, reconstructing three-dimensional coordinates to which the first feature point is inverse-projected.

According to the present disclosure, reconstraction accuracy for three-dimensional coordinates restored from two captured images can be improved.

BRIEF DESCRIPTION OF DRAWINGS

FIG. 6 is a flowchart illustrating one example of a three-dimensional information reconstraction operation procedure by the PC in the first exemplary embodiment.

DESCRIPTION OF EMBODIMENTS

Hereinafter, exemplary embodiments will be described in detail with appropriate reference to the drawings. Description may not be provided in unnecessary detail. For example, detailed description of well-known matters or duplicate description of substantially the same configurations may not be provided. This is to avoid the following description being unnecessarily redundant and to facilitate understanding for those skilled in the art. The appended drawings and the following description are provided in order for those skilled in the art to sufficiently understand the present disclosure and are not intended to limit the subject matter disclosed in the claims.

(First Exemplary Embodiment)

Figure 1:
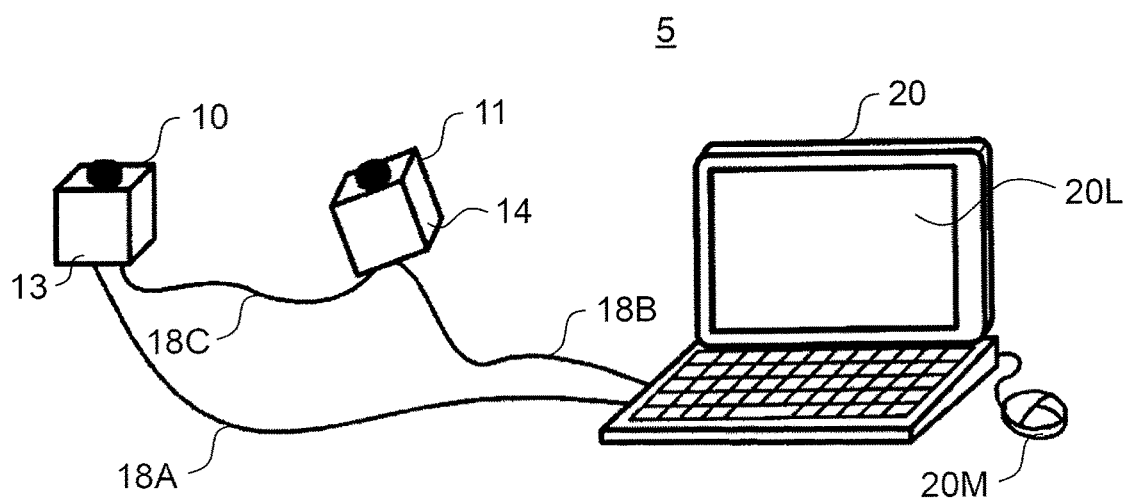
FIG. 1 is a schematic diagram illustrating a schematic configuration example of a stereocamera system in a first exemplary embodiment.

FIG. 1 is a schematic diagram illustrating a schematic configuration example of stereocamera system 5 in a first exemplary embodiment. Stereocamera system 5 includes, for example, first camera 10, second camera 11, and personal computer (PC) 20. First camera 10 and second camera 11 are connected to PC 20 respectively through, for example, cables 18A and 18B. First camera 10 and second camera 11 are connected to each other through, for example, cable 18C.

Stereocamera system 5 is one example of a three-dimensional information reconstraction (restoration) system. PC 20 is one example of a three-dimensional information reconstraction (restoration) device. First camera 10 and second camera 11 are one example of an image capturing device.

Though not illustrated, first camera 10 and second camera 11 include, for example, an image capturer that captures an image including a subject, and a sender that sends image data of the captured image to PC 20. The image capturing device is exemplified by, for example, a monitoring camera, a vehicle-mounted camera, an industrial camera, a medical camera, and a commercial camera.

First camera 10, for example, in response to an image acquisition request from PC 20, captures a first image (a first camera image; for example, a left-side image) of a predetermined scene including a subject and transfers image data of the captured first image to PC 20.

Second camera 11, for example, captures a second image (a second camera image; for example, a right-side image) of a predetermined scene including the subject in accordance with an image acquisition request from PC 20 and a synchronization signal from first camera 10 and transfers image data of the captured second image to PC 20. That is, second camera 11 captures the same subject included in the same scene from a different direction from first camera 10.

First camera 10 and second camera 11 respectively have first casing 13 and second casing 14 and are, for example, fixed cameras that are fixed to a ceiling, a wall, or another position. First camera 10 and second camera 11 are PTZ cameras that enable panning, tilting, and zooming. First camera 10 and second camera 11 may be cameras enabling operation of at least one of panning, tilting, and zooming or may be fixed cameras having a pan direction, a tilt direction, and a zoom magnification fixed.

A focal length, optical axis coordinates, and a distortion correction coefficient in first camera 10 and second camera 11 are previously known. First camera 10 and second camera 11 can output, for example, an image that is acquired by performing distortion correction of the captured image based on the distortion correction coefficient. Therefore, images captured by first camera 10 and second camera 11 may include a distortion-corrected image. The focal length, the optical axis coordinates, and the distortion correction coefficient may not be fixed values and may be changed as variable values.

PC 20 receives image data from first camera 10 and second camera 11 respectively through cables 18A and 18B and performs various types of image processing described later (for example, feature point extraction, corresponding point extraction, camera parameter estimation, and three-dimensional coordinate calculation).

Figure 2:
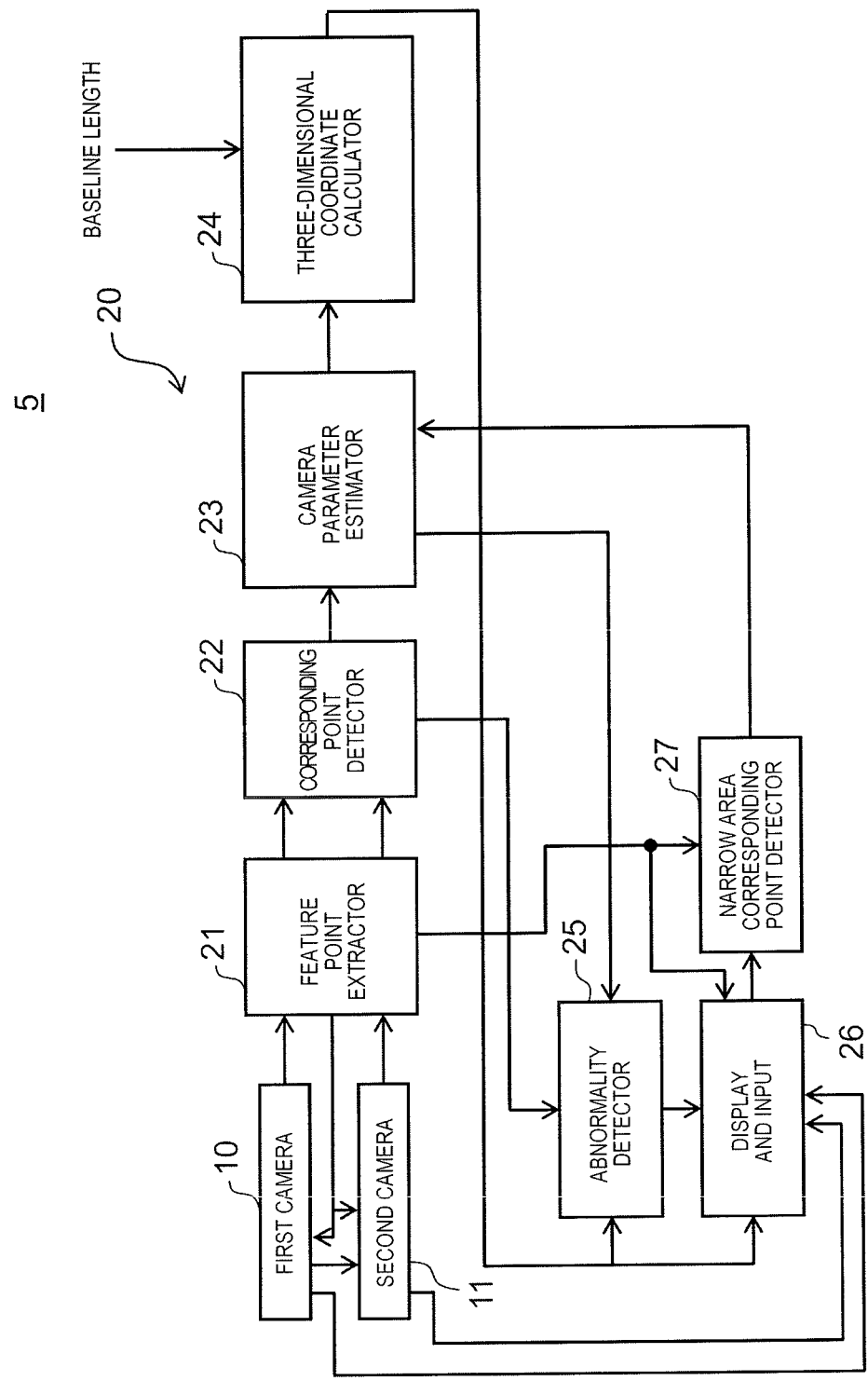
FIG. 2 is a block diagram illustrating a configuration example of a personal computer (PC) in the first exemplary embodiment.

FIG. 2 is a block diagram illustrating a configuration example of PC 20 in stereocamera system 5. PC 20 has feature point extractor 21, corresponding point detector 22, camera parameter estimator 23, three-dimensional coordinate calculator 24, abnormality detector 25, display and input 26, and narrow area corresponding point detector 27.

Feature point extractor 21 sends an image acquisition request to first camera 10 and second camera 11 and acquires and analyzes the first image captured by first camera 10 and the second image captured by second camera 11 in order.

First camera 10 is, for example, a camera that captures a left camera image of the subject and is disposed on the left side of FIG. 1. Second camera 11 is, for example, a camera that captures a right camera image of the subject and is disposed on the right side of FIG. 1.

Feature point extractor 21 has function as an image acquirer and detects a feature point (for example, a point in an area having strong edges) in the acquired left camera image and the right camera image in order. Detection of the feature point uses, for example, an algorithm of extracting a local feature point that is invariant with respect to enlargement, shrinkage, or rotation of an image. The algorithm includes, for example, scale-invariant feature transform (SIFT) and speed-up robust features (SURF).

Figure 3A:
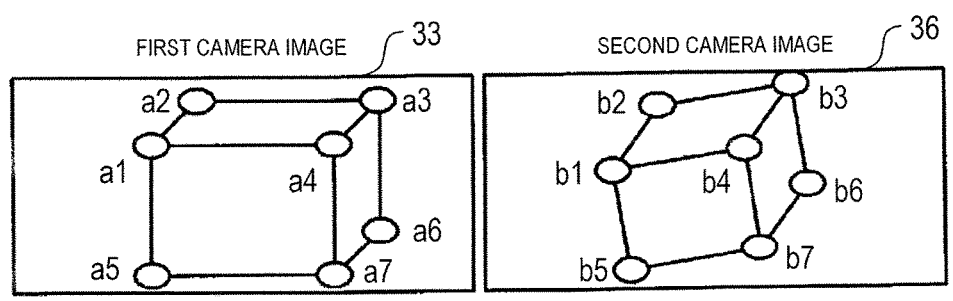
FIG. 3A is a schematic diagram for describing one example of a parameter for derivation of three-dimensional coordinates in the first exemplary embodiment.
Figure 3B:
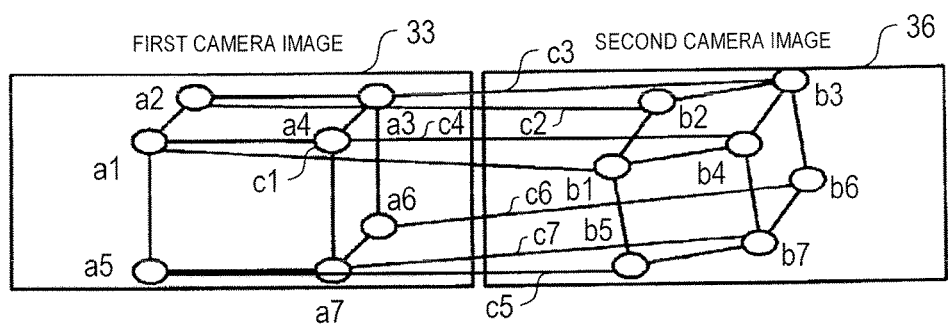
FIG. 3B is a schematic diagram for describing one example of a parameter for derivation of three-dimensional coordinates in the first exemplary embodiment.
Figure 3C:
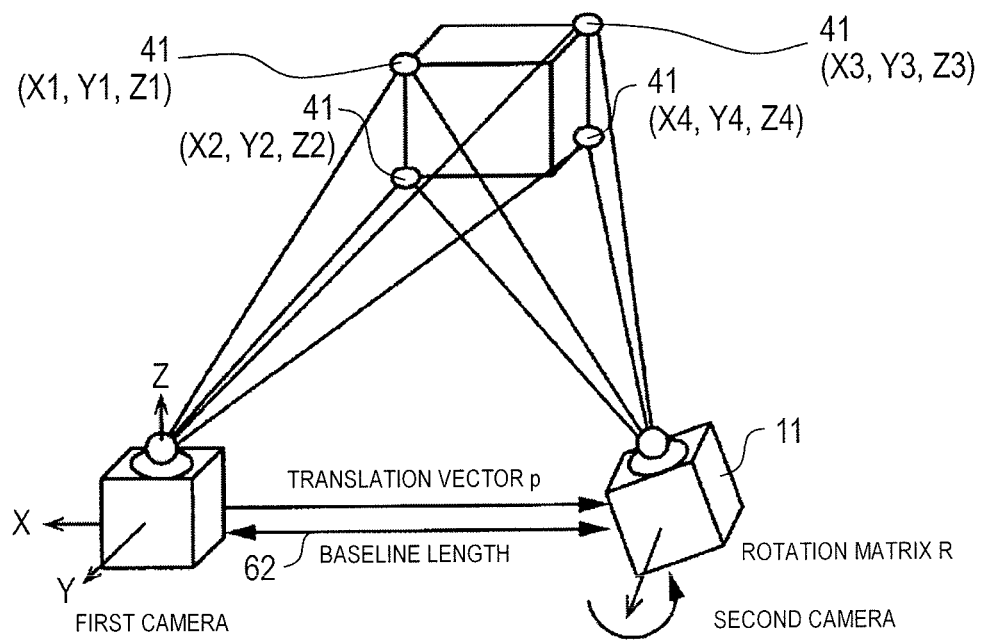
FIG. 3C is a schematic diagram for describing one example of a parameter for derivation of three-dimensional coordinates in the first exemplary embodiment.

FIG. 3A, FIG. 3B, and FIG. 3C are schematic diagrams for describing one example of a parameter for derivation of three-dimensional coordinates. The three-dimensional coordinates represent coordinates in a three-dimensional space in the case of using the position of first camera 10 as an origin (0, 0, 0). The three-dimensional coordinates represent the coordinates of target point 41 to which a predetermined point included in the first image or the second image is inverse-projected (three-dimensional reconstruction). The parameter for derivation of the three-dimensional coordinates (simply referred to as a parameter) includes, for example, a feature point, a corresponding point pair, and the position and the pose of a camera.

Feature point extractor 21, for example, detects feature points a1 to a7 from first image 33 and detects feature points b1 to b7 from second image 36 as illustrated in FIG. 3A. Feature points a1 to a7 will be simply referred to as feature point a unless otherwise required to be distinguished from one another.

Similarly, feature points b1 to b7 will be simply referred to as feature point b unless otherwise required to be distinguished from one another. The number of feature points is considered in the case of, for example, estimating the position and the pose of a camera. As the number of feature point is larger, estimation accuracy for estimation of the position and the pose of second camera 11 with respect to first camera 10 is increased.

Corresponding point detector 22, for example, detects feature points of high similarity included in first image 33 and second image 36 in order as a corresponding point pair (one example of corresponding points) as illustrated in FIG. 3B and outputs corresponding point pair information (image coordinate pair information).

The corresponding point pair information includes, for example, information in which corresponding points of a feature point in first image 33 and a feature point in second image 36 are associated (paired) with each other. Similarity being high includes, for example, windows of the feature point in first image 33 and the feature point in second image 36 included in the corresponding points having similar angles with the difference between the angles of the windows less than a predetermined angle.

Corresponding point detector 22 detects the corresponding points by, for example, a known technology (for example, a technology disclosed in PTL 1).

In FIG. 3B, feature point a1 included in first image 33 and feature point b1 included in second image 36 are detected as the corresponding points, and the corresponding point pair information is output. Feature point a2 included in first image 33 and feature point b2 included in second image 36 are detected as the corresponding points and are output as the corresponding point pair information. Similarly, feature points a3 to a7 and feature points b3 to b7 are detected as respective corresponding points, and respective pieces of corresponding point pair information are output.

These pieces of corresponding point pair information associate feature points a1 to a7 with feature points b1 to b7 by respective connecting lines (correspondence lines) c1 to c7 in FIG. 3B. The number of corresponding point pairs is considered in the case of, for example, estimating the position and the pose of a camera. As the number of corresponding point pairs is larger, estimation accuracy for estimation of the position and the pose of second camera 11 with respect to first camera 10 is increased.

Camera parameter estimator 23 estimates the position and the pose of second camera 11 with respect to first camera 10 in order based on, for example, the corresponding point pair information, the focal length of first camera 10, the focal length of second camera 11, the optical axis coordinates of first camera 10, and the optical axis coordinates of second camera 11 as illustrated in FIG. 3C.

The optical axis coordinates represent coordinates that correspond to the center of a lens in the captured image. The position of second camera 11 with respect to first camera 10 is represented by, for example, translation vector p. The pose of second camera 11 with respect to first camera 10 is represented by, for example, rotation matrix R.

Camera parameter estimator 23 estimates a camera parameter (for example, translation vector p and rotation matrix R) by a known technology (for example, the technology disclosed in PTL 1). Translation vector p corresponds to a three-dimensional translation vector disclosed in PTL 1. Rotation matrix R corresponds to a three-dimensional rotation matrix disclosed in PTL 1. Translation vector p is represented by, for example, Equation (1).

$$p = \begin{bmatrix} px \\ py \\ pz \end{bmatrix} \qquad (1)$$

px, py, and pz respectively denote translation vector components in X-axis, Y-axis, and Z-axis directions.

Rotation matrix R is represented by, for example, Equation (2).

$$R=R(\theta z) \cdot R(\theta y) \cdot R(\theta x) \qquad (2)$$

θz, θy, and θx respectively denote rotation angles (radian) about the Z axis, the Y axis, and the X axis and denote rotation angle components (rotation components) of each axis. R(θz), R(θy), and R(θx) respectively denote components of rotation matrix R of the Z axis, the Y axis, and the X axis. Rotation angle θ=0 indicates a parallel state of first camera 10 and second camera 11.

Three-dimensional coordinate calculator 24 calculates three-dimensional coordinates (X, Y, Z) of target point 41 in order based on the corresponding point pair information, an intrinsic parameter and an extrinsic parameter of first camera 10, an intrinsic parameter and an extrinsic parameter of second camera 11, and baseline length 62 (refer to FIG. 3C). Target point 41 is a point to which the feature point of first image 33 included in the corresponding point pair is inverse-projected. Three-dimensional coordinate calculator 24 calculates the three-dimensional coordinates of the target point by, for example, a known technology (for example, the technology disclosed in PTL 1).

The intrinsic parameter includes, for example, the focal length, the optical axis coordinates, the aspect ratio, and the skew distortion of first camera 10 and second camera 11. The extrinsic parameter includes, for example, the position (three components of the X axis, the Y axis, and the Z axis) and the pose (three rotation components around the X axis, the Y axis, and the Z axis) of second camera 11 with respect to first camera 10. Baseline length 62 is the distance between first camera 10 and second camera 11. The intrinsic parameter and the extrinsic parameter are determined, for example, per camera.

The intrinsic parameter is previously retained by memories, not illustrated, of each camera. The extrinsic parameter is derived in order and is retained in a memory not illustrated. Baseline length 62 is previously retained by, for example, the memory, not illustrated, of at least one of first camera 10 and second camera 11.

Feature point extractor 21, corresponding point detector 22, and camera parameter estimator 23 are one example of a parameter deriver that derives the parameter for derivation of the three-dimensional coordinates in order.

Abnormality detector 25 detects abnormality of the three-dimensional coordinates calculated by three-dimensional coordinate calculator 24.

Figure 4A:
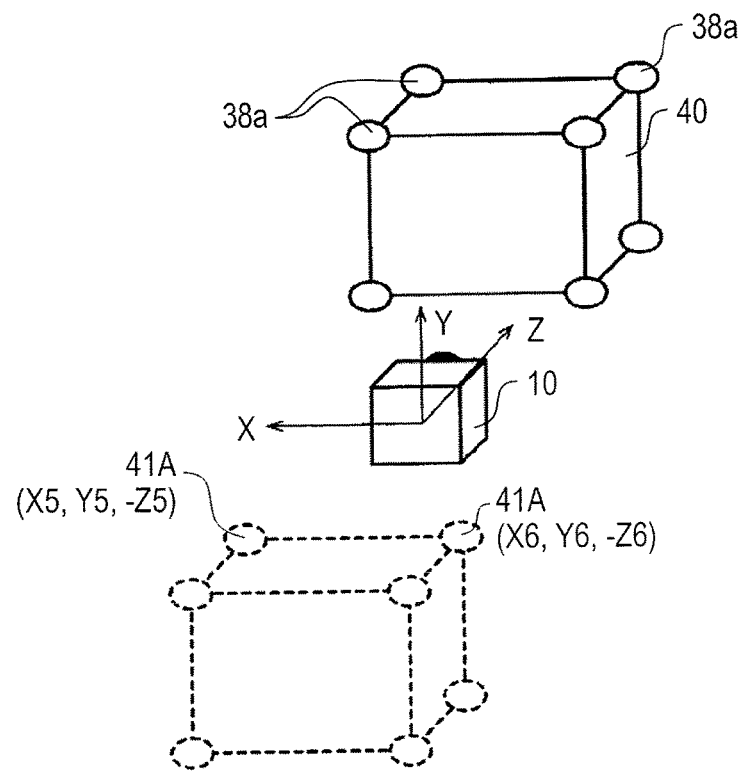
FIG. 4A is a schematic diagram for describing abnormality of three-dimensional coordinates in the first exemplary embodiment.
Figure 4B:
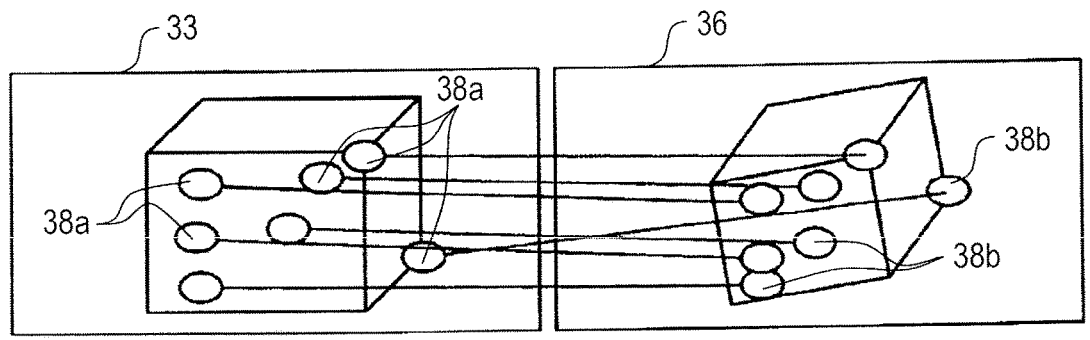
FIG. 4B is a schematic diagram for describing abnormality of three-dimensional coordinates in the first exemplary embodiment.

FIG. 4A and FIG. 4B are schematic diagrams for describing abnormality of the three-dimensional coordinates. The three-dimensional coordinates of the target point are represented by coordinates in a three-dimensional space in the case of using the position of first camera 10 as an origin (0, 0, 0). First camera 10 captures target object (subject) 40 that is positioned in front (has a positive value of a Z coordinate) and, for example, has feature point 38a in a corner portion.

Assume that, as illustrated in FIG. 4A, the Z coordinate of target point 41A calculated by three-dimensional coordinate calculator 24 has a negative value (refer to "−Z5" and "−Z6" in FIG. 4B), that is, target point 41A in the rear of first camera 10 is restored (first reconstraction result). In this case, abnormality detector 25 determines the three-dimensional coordinates of the target point to be abnormal.

In the case of feature point 38a included in first image 33 captured by first camera 10 being concentrated in a specific area such as the same plane as illustrated in FIG. 4B (second reconstraction result), abnormality detector 25 determines the three-dimensional coordinates of the target point to be abnormal. Determination as to whether or not feature points are concentrated in a specific area is performed, for example, as follows.

Abnormality detector 25 uses each feature point 38a (for example, all feature points) included in first image 33 to create an affine matrix and uses the affine matrix to perform affine transformation of each feature point 38a included in first image 33. The affine transformation is two-dimensional transformation in which linear transformation (for example, enlargement or shrinkage, shearing, or rotation) and translation are combined.

In the case of feature point 38b included in second image 36 being represented by performing affine transformation of feature point 38a included in first image 33, abnormality detector 25 determines original feature point 38a of the representation to be in the same plane.

In the case of the number of feature points 38b included in second image 36 by affine transformation of feature point 38a included in first image 33 being greater than or equal to, for example, 50% of all feature points, abnormality detector 25 determines feature point 38a included in first image 33 to be concentrated in a specific area. In this case, abnormality detector 25 determines the three-dimensional coordinates of the target point to be abnormal.

In the case of the values of the position (translation vector p) and the pose (rotation matrix R) of second camera 11 with respect to first camera 10 being clearly different from those in the state of actual installation (third reconstraction result), abnormality detector 25 determines the three-dimensional coordinates of the target point to be abnormal.

For example, second camera 11 is originally installed towards the inside (first camera 10 side). In this case, in the case of second camera 11 being determined to be towards the outside (opposite side from first camera 10) by the camera parameter (for example, translation vector p and rotation matrix R) estimated by camera parameter estimator 23, abnormality detector 25 determines the three-dimensional coordinates of the target point to be abnormal.

Abnormality detector 25 may determine the three-dimensional coordinates of the target point to be abnormal in the case of not only the first reconstraction result, the second reconstraction result, and the third reconstraction result above but also in the case of acquisition of another reconstraction result. For example, abnormality detector 25 may determine the three-dimensional coordinates of the target point to be abnormal in the case of a small number of feature points that is less than or equal to a predetermined value or in the case of a small number of corresponding points that is less than or equal to a predetermined value.

Display and input 26 includes, for example, display 20L as one example of a display and input device 20M as one example of an input (refer to FIG. 1). Display 20L is configured of a liquid crystal display or the like. Input device 20M is configured of a mouse, a keyboard, or the like. Display 20L and input device 20M may be configured to be integrated as a touch panel.

Figure 5A:
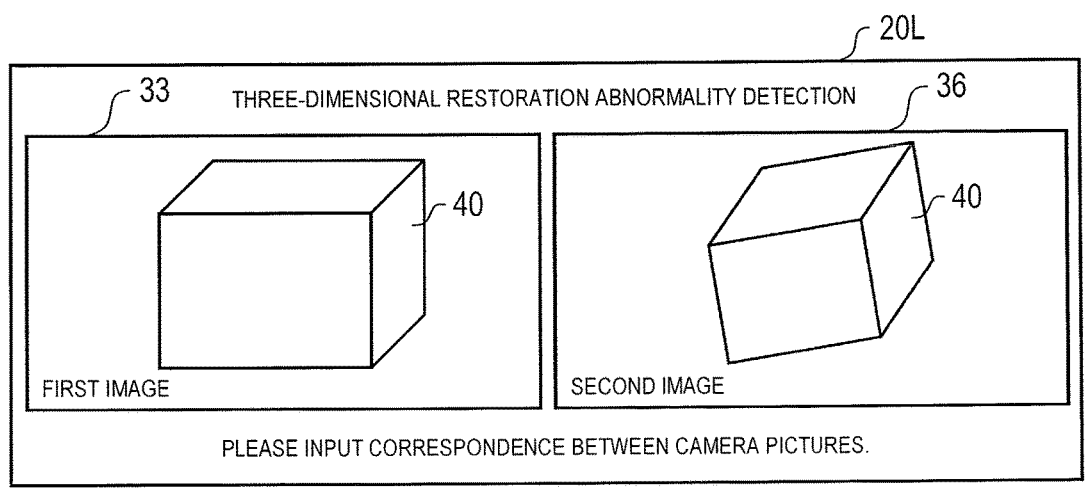
FIG. 5A is a schematic diagram describing corresponding point area specification and corresponding point detection in the first exemplary embodiment.
Figure 5B:
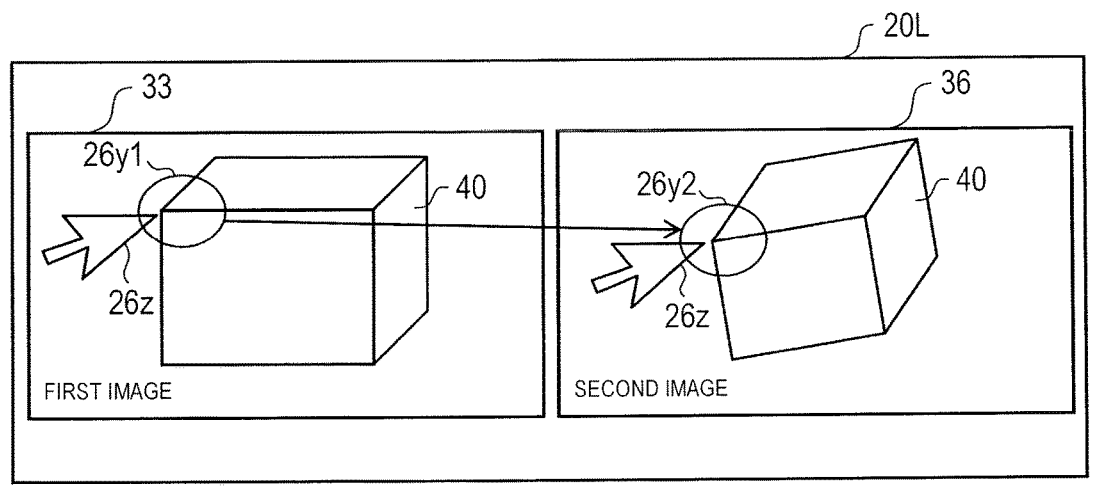
FIG. 5B is a schematic diagram describing corresponding point area specification and corresponding point detection in the first exemplary embodiment.
Figure 5C:
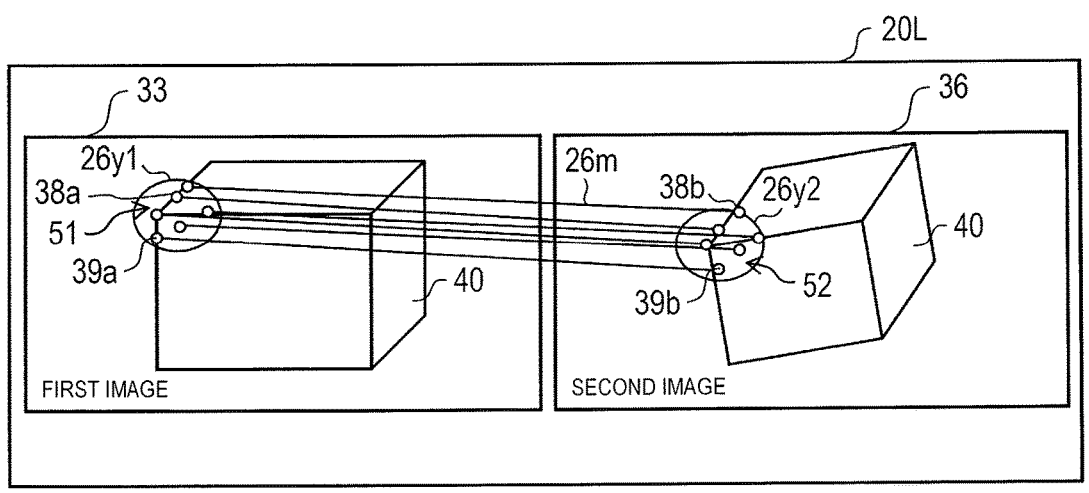
FIG. 5C is a schematic diagram describing corresponding point area specification and corresponding point detection in the first exemplary embodiment.

FIG. 5A, FIG. 5B, and FIG. 5C are schematic diagrams for describing one example of corresponding point area specification and corresponding point detection.

Display and input 26 displays first image 33 captured by first camera 10 and second image 36 captured by second camera 11 in a screen of display 20L as illustrated in FIG. 5A. Display and input 26, in the case of the three-dimensional coordinates of the target point being abnormal, displays the state (the state of abnormality) in the screen of display 20L. Display and input 26 performs displaying to prompt a user of PC 20 to specify an area that includes corresponding points between first image 33 and second image 36 (corresponding point area).

The user, as illustrated in FIG. 5B, uses input device 26M to operate cursor 26z displayed in the screen of display 20L and specifies corresponding point areas 26y1 and 26y2 by enclosing with cursor 26z in each of first image 33 and the second image 36 to include any point (for example, a point that is easily identified from the user).

Display and input 26 receives specified left and right corresponding point areas (hereinafter, simply referred to as areas) 26y1 and 26y2 a predetermined number of times (for example, five times) or more. Receiving specification of many corresponding point areas a predetermined number of times or more enables three-dimensional coordinate calculator 24 to generate the three-dimensional coordinates by using many corresponding points.

Display and input 26, when corresponding point areas 26y1 and 26y2 are specified, may respectively display feature points 38a and 38b in an overlaid manner on first image 33 and second image 36 displayed in the screen of display 20L. In this case, the user can specify corresponding point areas 26y1 and 26y2 while viewing feature points 38a and 38b respectively displayed in an overlaid manner on first image 33 and second image 36.

Specification of the corresponding point area may be performed by specifying the corresponding point area in a part of the captured image or may be performed by specifying a point (for example, a feature point) included in the captured image and setting a range with the specified feature point as a center.

Display and input 26 may perform matching processing of feature point 38a included in first image 33 with feature point 38b included in second image 36 and previously display an area of a candidate to include feature points of high similarity. In this case, the user can easily specify corresponding point areas 26y1 and 26y2 by selecting the area of a candidate, and operability is improved.

Display and input 26, in the case of the three-dimensional coordinates of the target point being determined to be abnormal, may display the result of the corresponding points at the time of being determined to be abnormal (previous corresponding points) and specify a corresponding point area to add new corresponding points. In this case, the previous result that is determined to be abnormal can be effectively used.

Narrow area corresponding point detector 27 detects corresponding points 39a and 39b in corresponding point areas 26y1 and 26y2 specified in display and input 26 as illustrated in FIG. 5C.

The manner of corresponding point detection by narrow area corresponding point detector 27 is the same as that of corresponding point detector 22 but has a limited corresponding point area detected. Thus, in the case of narrow area corresponding point detector 27 detecting corresponding points, the corresponding points are easily detected compared with corresponding point detector 22.

Narrow area corresponding point detector 27 detects feature points of high similarity included in first image 33 and second image 36 in order as the corresponding point pair and outputs the corresponding point pair information.

By using the corresponding point pair information acquired by narrow area corresponding point detector 27, camera parameter estimator 23, as described above, estimates the position and the pose of second camera 11 with respect to first camera 10, and three-dimensional coordinate calculator 24 calculates the three-dimensional coordinates of the target point.

Next, an operation example of stereocamera system 5 will be described.

Figure 7:
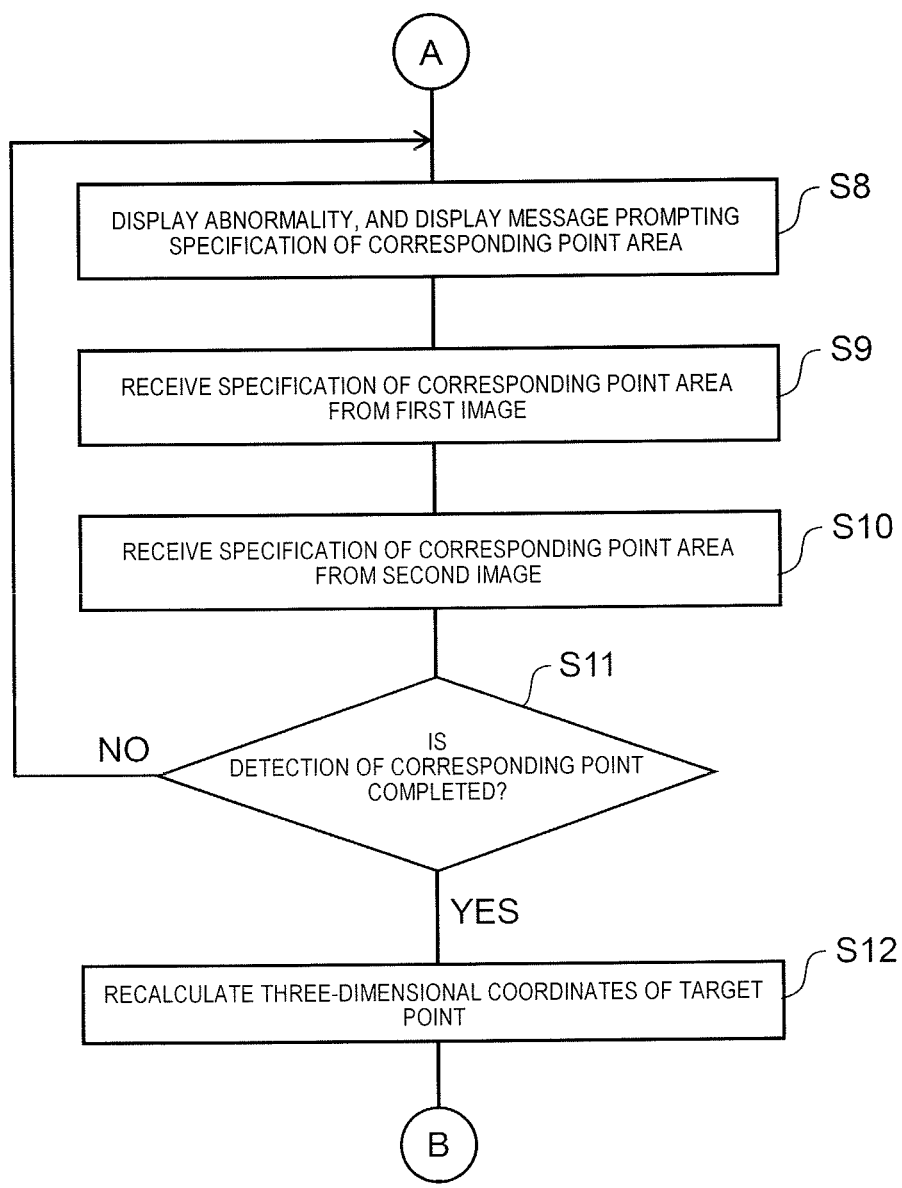
FIG. 7 is a flowchart (continued from FIG. 6) illustrating one example of the three-dimensional information reconstraction operation procedure by the PC in the first exemplary embodiment.

FIG. 6 and FIG. 7 are flowcharts illustrating one example of a three-dimensional information reconstruction operation procedure by PC 20. The three-dimensional information reconstruction processing is performed, for example, at the time of initial setting of stereocamera system 5 (for example, at the time of camera installation) or at the time of calibration after initial setting.

Figure 8:
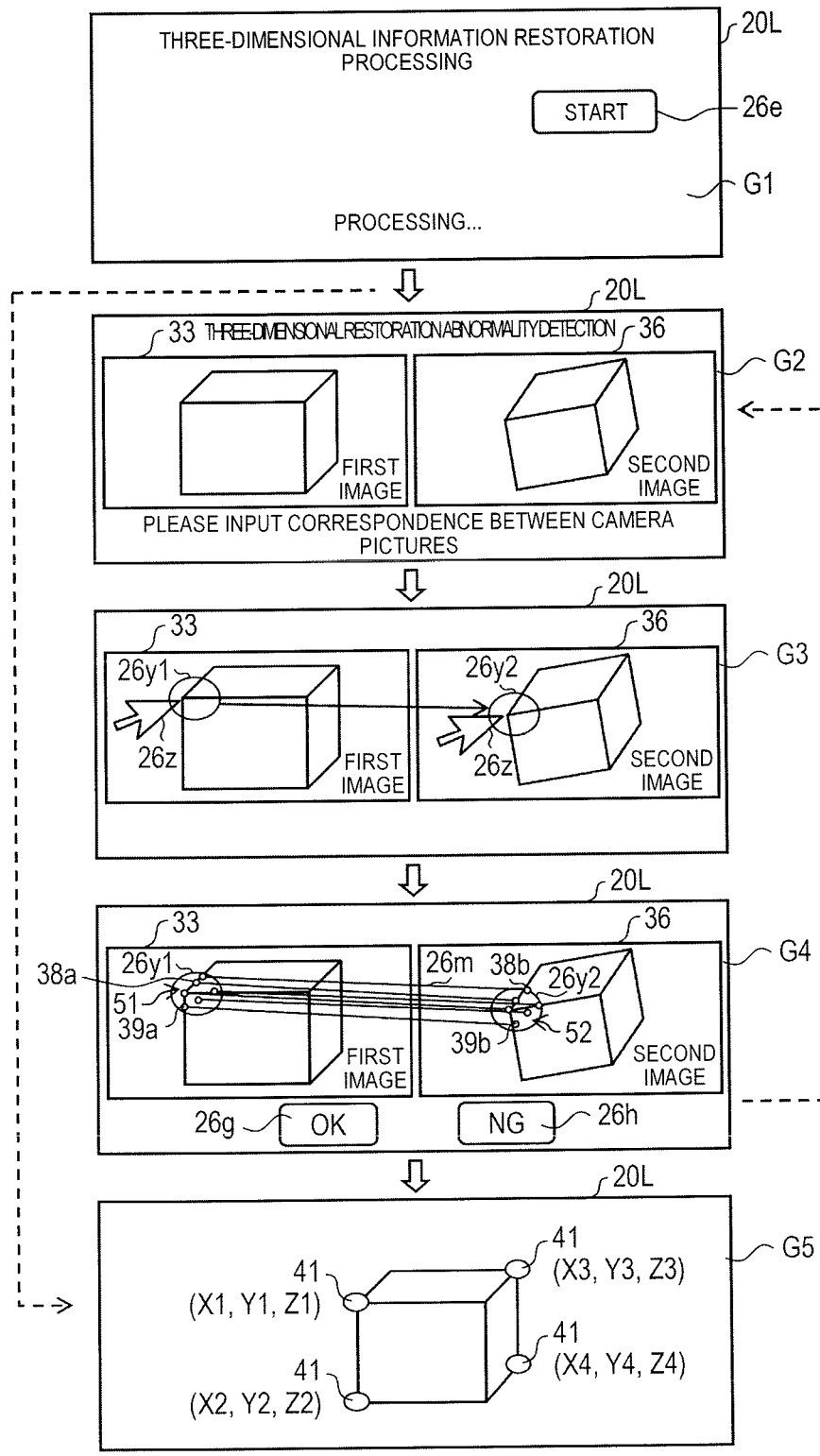
FIG. 8 is a schematic diagram illustrating a transition example of a user interface (UI) screen displayed on a display in the first exemplary embodiment.

FIG. 8 is a schematic diagram illustrating a transition example of a user interface (UI) screen displayed on display 20L. For example, if start button 26e is selected through input device 20M in a state of initial screen G1 of the three-dimensional reconstruction processing being displayed on display 20L, display 20L displays a message representing "processing" in screen G1.

If the three-dimensional information reconstruction processing is started, first, feature point extractor 21 makes an image acquisition request to first camera 10 and second camera 11 and acquires image data of first image 33 and second image 36 respectively from first camera 10 and second camera 11 (S1). The image data may be periodically acquired without an image acquisition request made.

Feature point extractor 21 extracts feature points 38a and 38b respectively from first image 33 and second image 36 (S2). Corresponding point detector 22 detects, from the similarity of the feature points extracted by feature point extractor 21, corresponding points 39a and 39b representing a correspondence between first image 33 and second image 36 and outputs the corresponding point pair information (image coordinate pair information) representing the correspondence (S3).

Camera parameter estimator 23 estimates the position and the pose of second camera 11 with respect to first camera 10 based on the corresponding point pair information, the focal length of first camera 10, the focal length of second camera 11, the optical axis coordinates of first camera 10, and the optical axis coordinates of second camera 11 (S4).

Three-dimensional coordinate calculator 24 calculates the three-dimensional coordinates (X, Y, Z) of target point 41 in order based on the corresponding point pair information, the intrinsic parameter and the extrinsic parameter of first camera 10, the intrinsic parameter and the extrinsic parameter of second camera 11, and baseline length 62 (S5). The target point is, as described above, a point to which the feature point of first image 33 included in the corresponding point pair is inverse-projected.

Abnormality detector 25 determines whether or not the three-dimensional coordinates of the target point are abnormal according to whether or not, for example, the result calculated in S5 corresponds to the first reconstruction result, the second reconstruction result, or the third reconstruction result above (S6). Abnormality may also be determined in the case of acquisition of another reconstruction result as described above.

In the case of the reconstruction result of the three-dimensional coordinates in S5 not being determined to be abnormal, display and input 26 displays the reconstruction result of the three-dimensional coordinates of the target point (screen G5), and PC 20 finishes the present operation.

In the case of the reconstruction result of the three-dimensional coordinates in S5 being determined to be abnormal, display and input 26 displays the state of the three-dimensional coordinates of the target point being abnormal on display 20L (screen G2) and displays a message prompting specification of the corresponding point area on display 20L (screen G2) (S8).

In display and input 26, the user specifies corresponding point area 26y1 including any point (for example, an easily identified point) (for example, a peripheral area with the point as a center) by enclosing with cursor 26z by input device 20M while viewing first image 33 displayed on display 20L. Accordingly, display and input 26 receives specified corresponding point area 26y1 (screen G3) (S9).

Similarly, in display and input 26, the user specifies corresponding point area 26y2 including a point corresponding to above any point (for example, a peripheral area with the point as a center) by enclosing with cursor 26z by input device 20M while viewing second image 36 displayed on display 20L. Accordingly, display and input 26 receives specified corresponding point area 26y2 (screen G3) (S10).

In S9 and S10, display and input 26 may extract and display a candidate area of one or more corresponding points in second image 36 by using the amount of features included in corresponding point area 26y1 that is specified in first image 33 through the input device or the like.

Corresponding point area 26y2 in second image 36 that corresponds to corresponding point area 26y1 specified in first image 33 is highly likely to be in the displayed candidate area of corresponding points. Corresponding point area 26y2 corresponding to corresponding point area 26y1, in the case of being included in the candidate area of corresponding points, for example, may be selected and specified from the displayed candidate area of corresponding points by display and input 26.

That is, the user can more simply specify corresponding point area 26y2 in second image 36 that truly corresponds to corresponding point area 26y1 specified in first image 33.

Display and input 26 displays the corresponding point relationship on display 20L (screen G4) and determines whether or not to complete the corresponding point detection (S11).

The corresponding point detection is completed by, for example, the user selecting OK button 26g by using cursor 26z through input device 20M. In this case, the user considers a basis of determination such as the number of specified corresponding point areas 26y being greater than or equal to a predetermined value (for example, a value of five) or the corresponding point pairs associated by correspondence line 26m being evenly distributed.

Display and input 26 returns to S8 if receiving selection of NG button 26h by the user using cursor 26z through input device 20M and detecting the corresponding point detection not to be completed.

Display and input 26 completes the corresponding point detection if receiving selection of OK button 26g by the user using cursor 26z through input device 20M.

Narrow area corresponding point detector 27, for only feature point groups 51 and 52 in corresponding point areas 26y1 and 26y2 specified in display and input 26, detects feature points of high similarity included in first image 33 and second image 36 in order as the corresponding point pair and outputs the corresponding point pair information. Feature point group 51 includes one or more feature points.

Camera parameter estimator 23 uses the new corresponding point pair information to re-estimate the position and the pose of second camera 11 with respect to first camera 10, and three-dimensional coordinate calculator 24 calculates the three-dimensional coordinates (X, Y, Z) of the target point (S12). Then, PC 20 returns to S6.

That is, in the case of abnormality detector 25 determining the presence or absence of abnormality of the three-dimensional coordinates of the target point in S6 and determining the three-dimensional coordinates of the target point to be normal in S7, display and input 26 displays the state of the three-dimensional reconstraction information being normal (screen G5). PC finishes displaying related to the three-dimensional information reconstruction processing and finishes the present operation.

Accordingly, in stereocamera system 5, in the case of abnormality detector 25 determining the three-dimensional coordinates of the target point to be abnormal, display and input 26 displays the state and displays a message prompting specification of the corresponding point area on display 20L. Display and input 26 receives corresponding point areas 26y1 and 26y2 that are specified from the user through input device 20M or the like. Narrow area corresponding point detector 27 outputs the corresponding point pair information that is detected for only corresponding point areas 26y1 and 26y2 specified in display and input 26. Camera parameter estimator 23 uses the output corresponding point pair information to re-estimate the position and the pose of second camera 11 with respect to first camera 10, and three-dimensional coordinate calculator 24 calculates the three-dimensional coordinates of the target point.

According to stereocamera system 5, in the case of the three-dimensional coordinates of the target point being determined to be abnormal, the user can directly specify the corresponding point area (corresponding point areas 26y1 and 26y2) to enclose an easily identified point, while confirming the first image and the second image. Therefore, stereocamera system 5 can accurately detect the corresponding point pair information by using a feature point in the specified corresponding point area, compared with the case of causing PC 20 to perform processing related to three-dimensional information reconstruction (corresponding point detection and the like). Consequently, stereocamera system 5 can improve reconstraction accuracy for the three-dimensional coordinates of the target point restored from two captured images.

Stereocamera system 5, in the case of the three-dimensional coordinates of the target point being determined to be abnormal, can support normalization of the three-dimensional coordinates of the target point by taking over a part of the three-dimensional information reconstruction operation and by assisting with a simple input operation through input device 20M.

Stereocamera system 5 may calculate the three-dimensional coordinates of the target point by using the feature point group that is specified in the corresponding point area through input device 20M by the user who views and confirms display 20L. Accordingly, reconstraction accuracy for the three-dimensional coordinates can be improved.

When the user specifies the corresponding point area, first image 33 and second image 36 may be displayed on display 20L, and the user may specify corresponding point area 26y by enclosing with cursor 26z on these images through input device 20M. Accordingly, a user interface that is intuitively easy to understand with a simple operation can be provided.

(Second Exemplary Embodiment)

The first exemplary embodiment illustrates performing the same processing as at the time of initial setting in the case of performing calibration, without storing the feature point group included in the corresponding point area specified in the display and input. That is, in the stereocamera system, the corresponding point area is specified by the display and input each time the three-dimensional coordinates of the target point are determined to be abnormal.

A second exemplary embodiment assumes that the stereocamera system groups and stores the feature point group included in the corresponding point area specified in the display and input. Accordingly, in calibration afterward, specification of the corresponding point area by the display and input may not be required.

Figure 9:
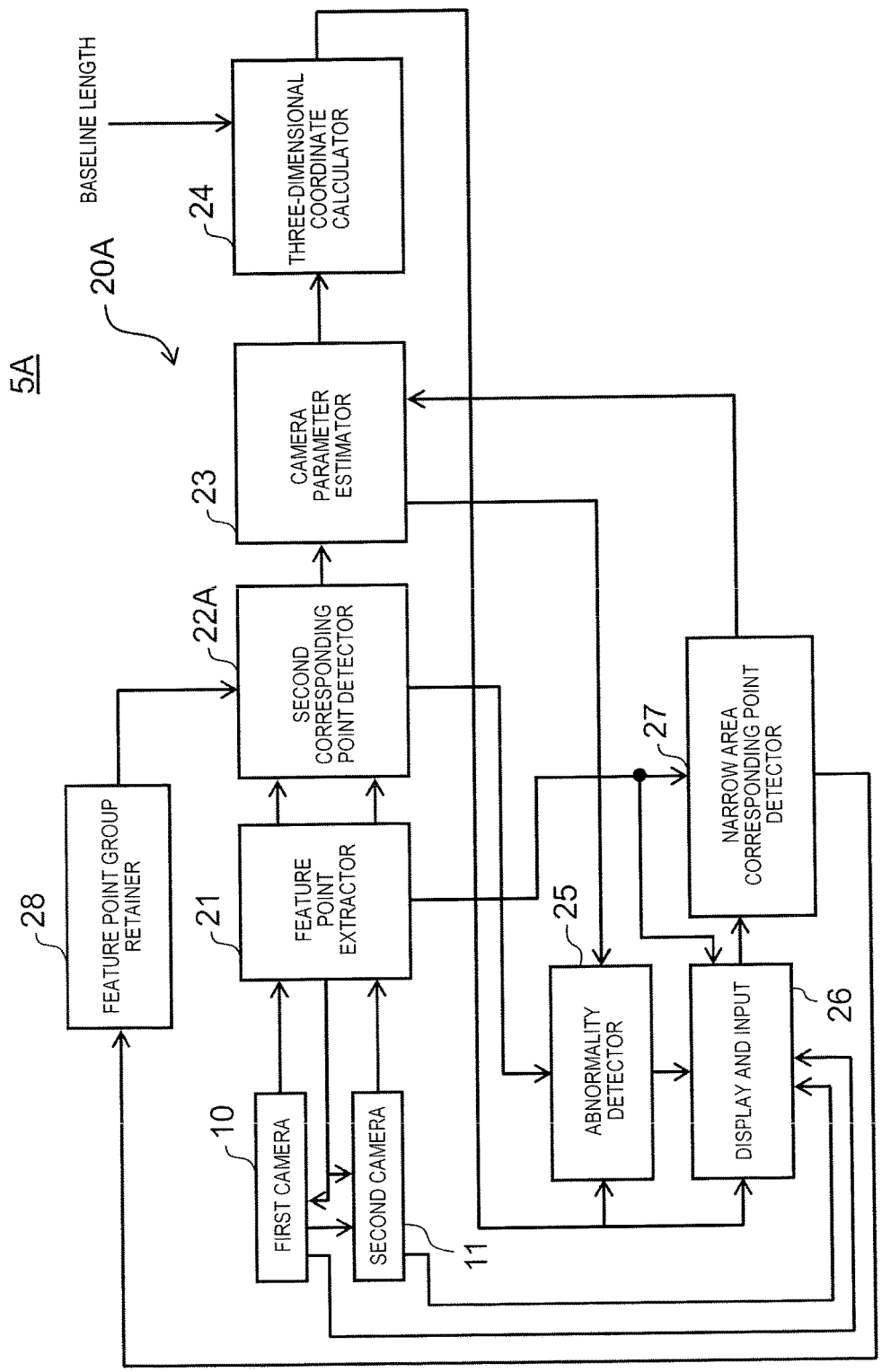
FIG. 9 is a block diagram illustrating a configuration example of a PC in a second exemplary embodiment.

FIG. 9 is a block diagram illustrating a configuration example of PC 20A in stereocamera system 5A in the second exemplary embodiment. Stereocamera system 5A of the second exemplary embodiment has almost the same configuration as stereocamera system 5 of the first exemplary embodiment. The same constituents in FIG. 9 as stereocamera system 5 in FIG. 1 will be designated by the same reference signs, and descriptions thereof will not be provided or will be simplified.

PC 20A has feature point group retainer 28 and second corresponding point detector 22A in addition to the configuration of PC 20 of the first exemplary embodiment. Corresponding point detector 22 included in PC 20 is removed in PC 20A.

Figure 10A:
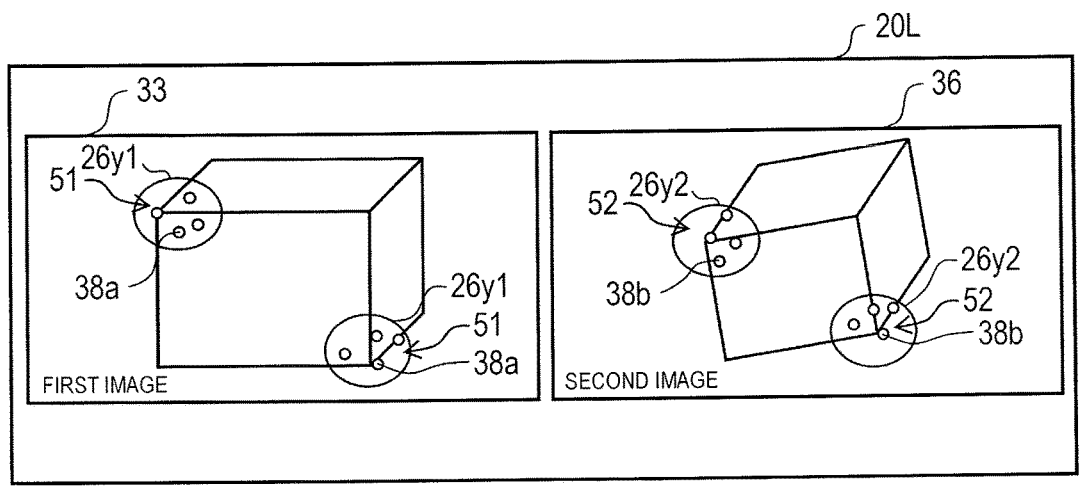
FIG. 10A is a schematic diagram for describing one example of grouping of a feature point group in the second exemplary embodiment.
Figure 10B:
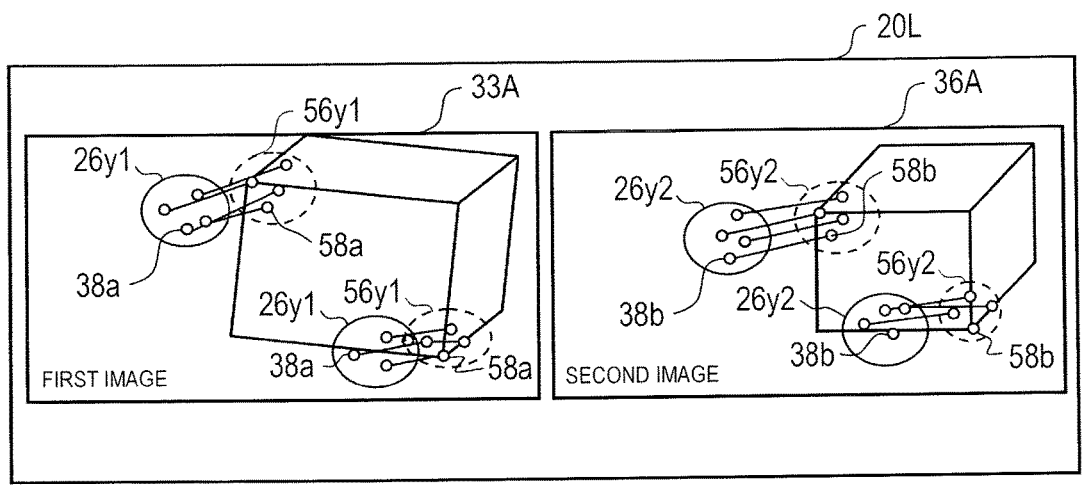
FIG. 10B is a schematic diagram for describing a feature point group movement example in the second exemplary embodiment.
Figure 10C:
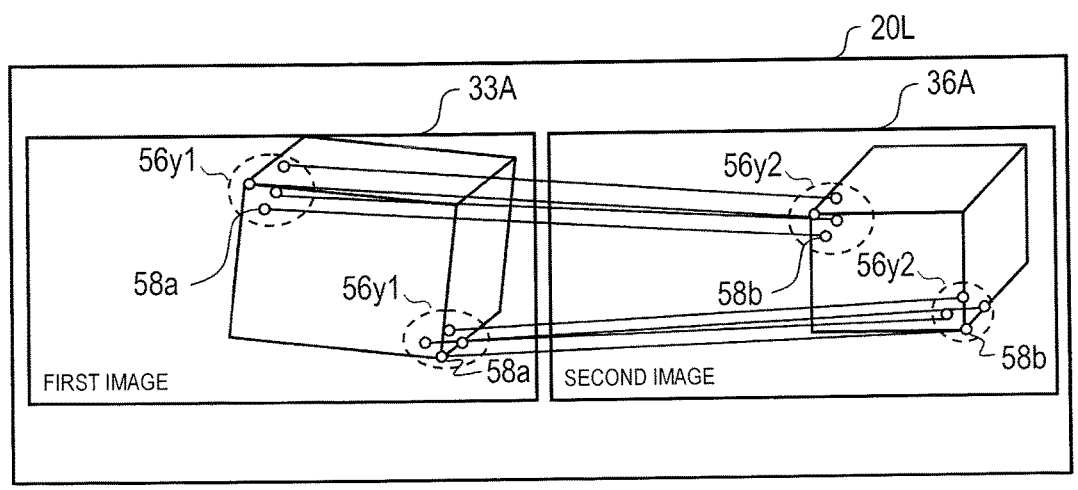
FIG. 10C is a schematic diagram for describing a corresponding point detection example in the second exemplary embodiment.

FIG. 10A is a schematic diagram for describing one example of grouping of the feature point group. FIG. 10B is a schematic diagram for describing a feature point group movement example. FIG. 10C is a schematic diagram for describing a corresponding point detection example.

As illustrated in FIG. 10A, feature point group retainer 28 groups feature point groups 51 and 52 respectively included in corresponding point areas 26y1 and 26y2 specified in first image 33 and second image 36 by display and input 26 and stores feature point groups 51 and 52 for the first camera and for the second camera.

Feature point group retainer 28, in the case of new feature points 38a and 38b included in corresponding point areas 26y1 and 26y2 being extracted at the time of any calibration after initial setting, may additionally store the extracted feature points. Accordingly, the number of feature points can be increased, detection accuracy for the corresponding points can be improved, and reconstraction accuracy for the three-dimensional coordinates can be improved.

Second corresponding point detector 22A reads feature point groups 51 and 52 stored in feature point group retainer 28 and searches for a correspondence of feature point groups 51 and 52 with each feature point extracted by feature point extractor 21. The correspondence is searched for by, for example, acquiring similarity of feature points 38a and 38b included in feature point groups 51 and 52 with the feature points included in each feature point extracted by feature point extractor 21.

Accordingly, second corresponding point detector 22A can detect, in new captured first image 33A and second image 36A, corresponding point areas 56y1 and 56y2 that respectively correspond to corresponding point areas 26y1 and 26y2 specified by the user.

As illustrated in FIG. 10B, display 20L displays corresponding point areas 26y1 and 26y2 including feature point groups 51 and 52 as if being moved to corresponding point areas 56y1 and 56y2 enclosed in new captured first image 33A and second image 36A.

Second corresponding point detector 22A, as illustrated in FIG. 10C, searches for corresponding points 58a and 58b (feature points as the corresponding points) in new found corresponding point areas 56y1 and 56y2 and outputs the corresponding point pair information.

Camera parameter estimator 23 uses the output corresponding point pair information to re-estimate the position and the pose of second camera 11 with respect to first camera 10. Three-dimensional coordinate calculator 24 calculates the three-dimensional coordinates of the target point.

Feature point extractor 21 may redetect feature points in new found corresponding point areas 56y1 and 56y2, and second corresponding point detector 22A may re-search for corresponding points by using the calculated feature points.

Next, an operation example of stereocamera system 5A will be described.

Figure 11:
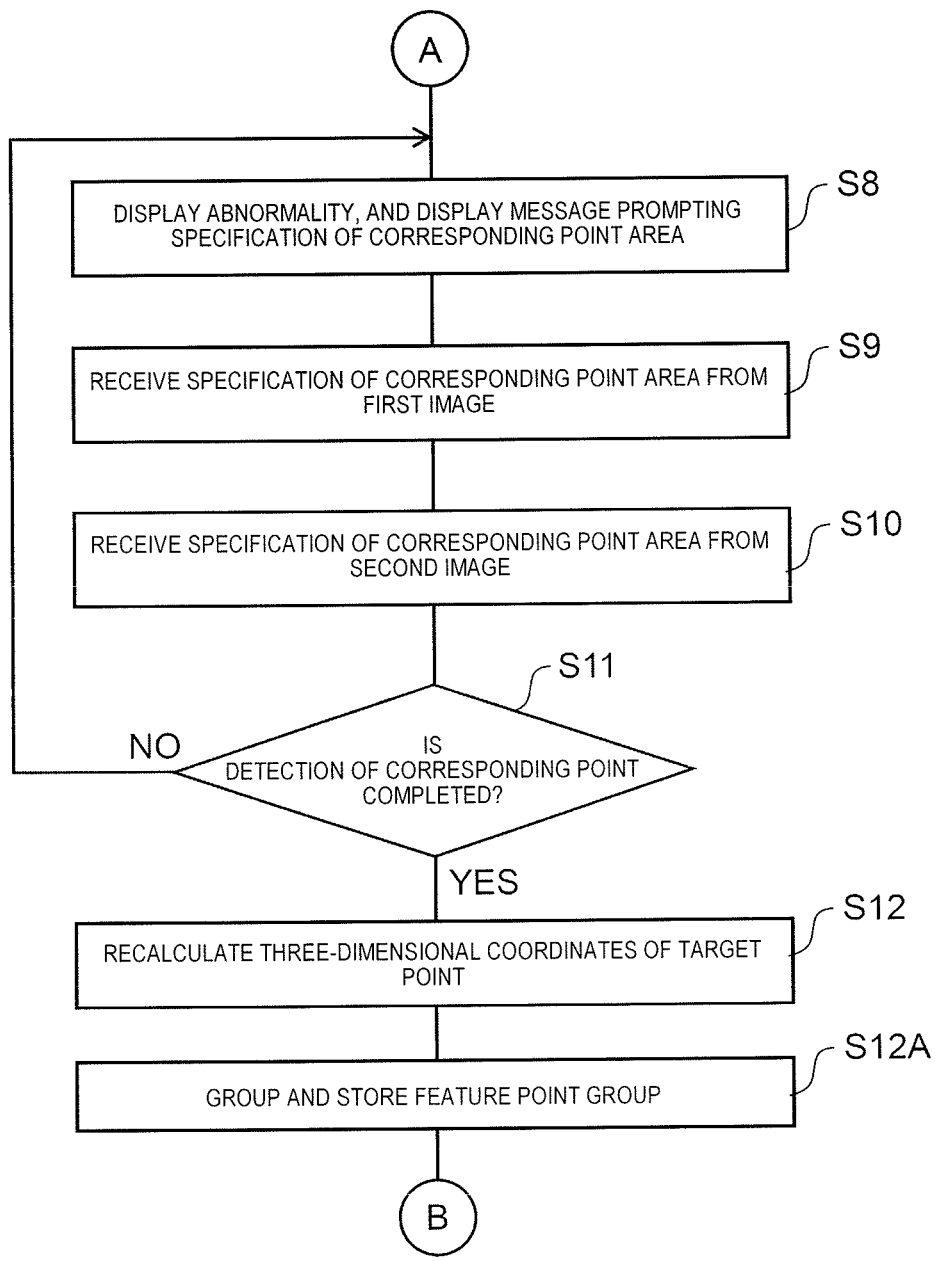
FIG. 11 is a flowchart illustrating one example of a part of a three-dimensional information reconstruction operation procedure by the PC that is performed at the time of initial setting in the second exemplary embodiment.

FIG. 11 is a flowchart illustrating one example of a part of a three-dimensional information reconstraction operation procedure by PC 20A that is performed at the time of initial setting. The three-dimensional information reconstraction processing is performed at the time of initial setting of stereocamera system 5A. FIG. 11 corresponds to FIG. 7 described in the first exemplary embodiment. The same step processes in FIG. 11 as in the step processes in FIG. 7 will be designated by the same step numbers, and descriptions thereof will not be provided or will be simplified. A UI screen that is displayed on display 20L at the time of initial setting is the same as FIG. 8 described in the first exemplary embodiment.

In the second exemplary embodiment, after the process of S12 is performed, feature point group retainer 28 groups and stores feature point group 51 included in corresponding point area 26y1 specified in first image 33 in S9 and feature point group 52 included in corresponding point area 26y2 specified in second image 36 in S10 (S12A). Then, PC 20A returns to the process of S6.

Accordingly, feature point groups 51 and 52 that are respectively included in corresponding point areas 26y1 and 26y2 specified by display and input 26 at the time of initial setting are grouped and stored in feature point group retainer 28. A new detected feature point group may be grouped and stored at the time of calibration after initial setting.

Figure 12:
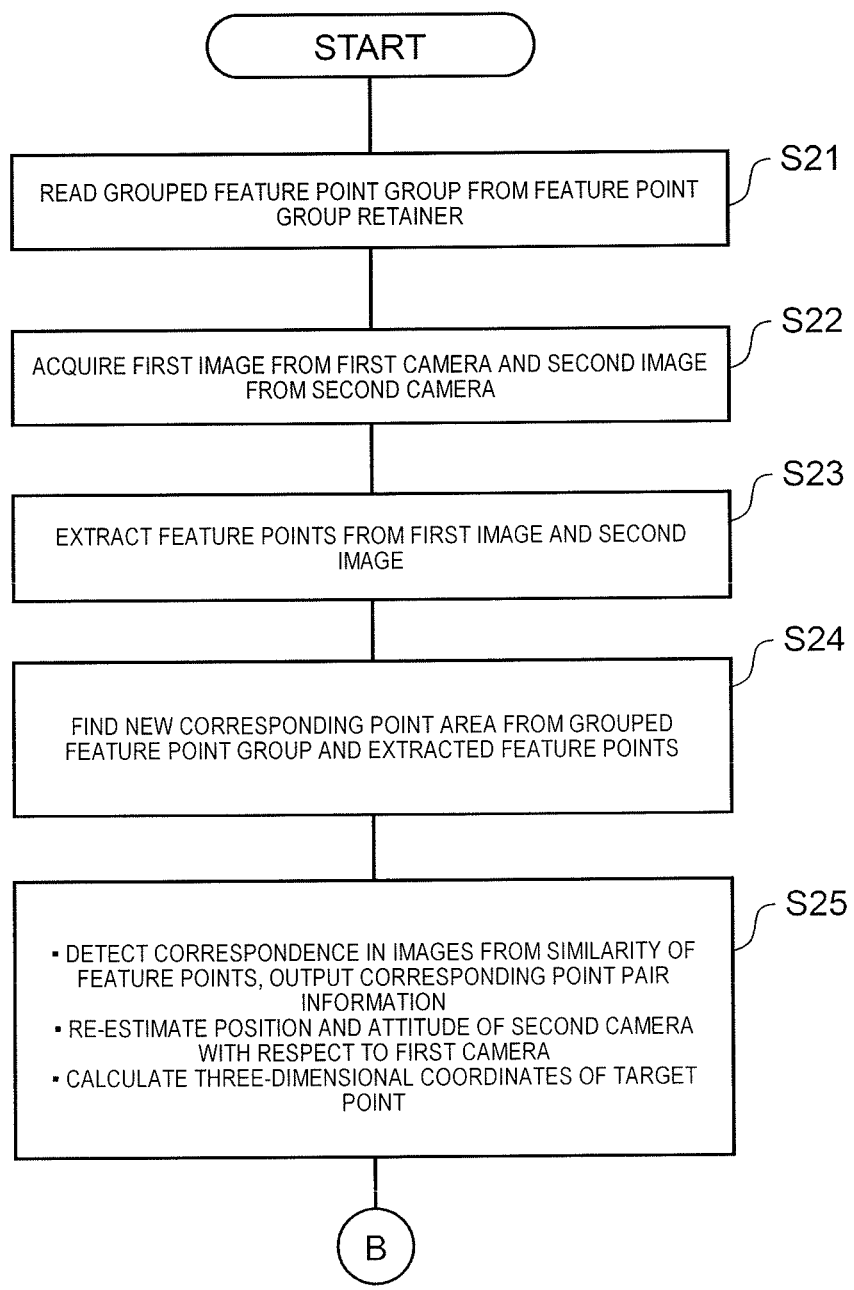
FIG. 12 is a flowchart illustrating one example of a part of a three-dimensional information reconstruction operation procedure by the PC that is performed at the time of calibration in the second exemplary embodiment.

FIG. 12 is a flowchart illustrating one example of a part of a three-dimensional information reconstraction operation procedure by PC 20A that is performed at the time of calibration after initial setting. The three-dimensional information reconstraction processing is performed at the time of calibration after initial setting or at the time of periodic calibration in stereocamera system 5A. The three-dimensional information reconstraction processing enables PC 20A to detect, for example, change in the orientation of a camera.

Figure 13:
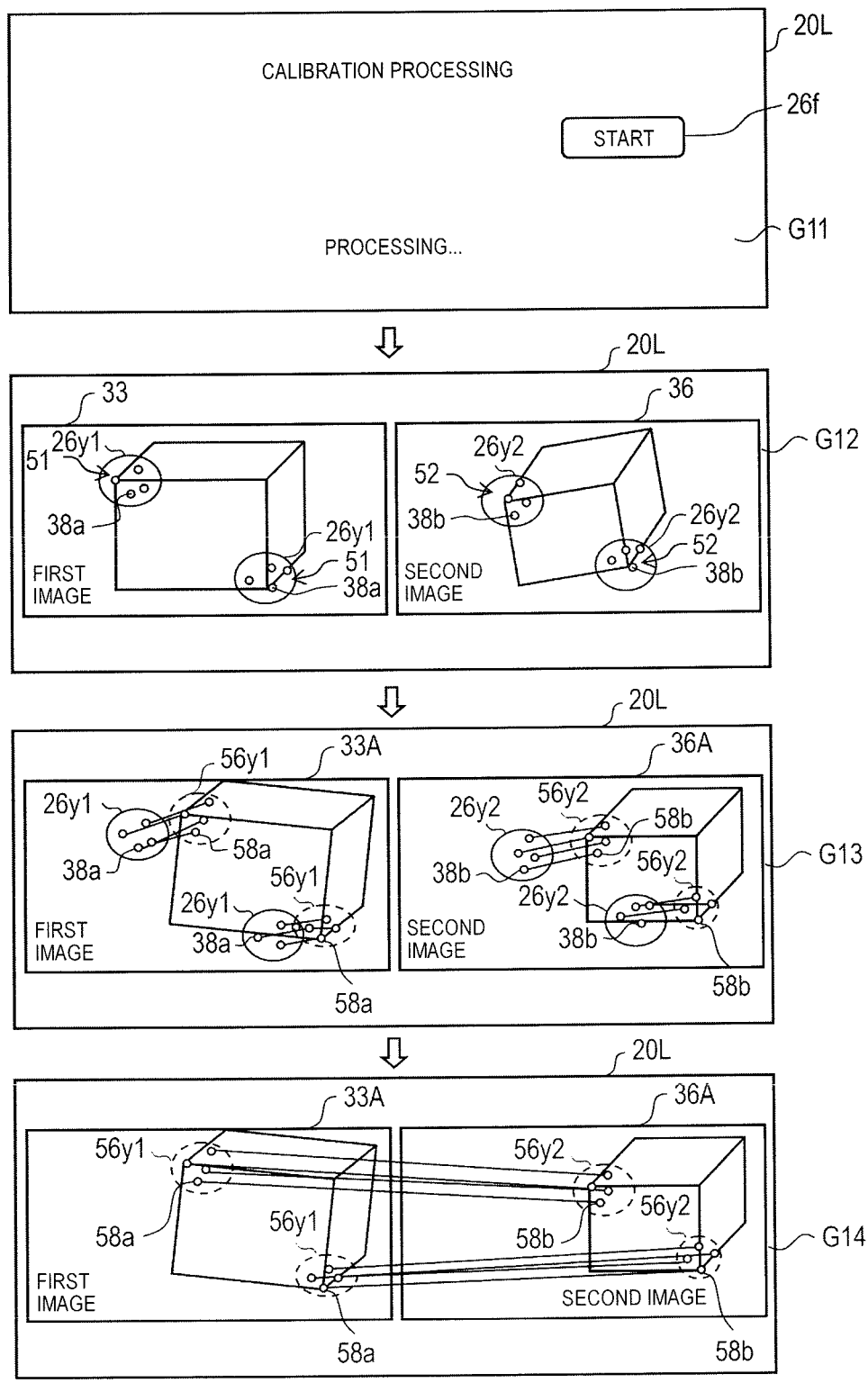
FIG. 13 is a schematic diagram illustrating a transition example of a UI screen displayed on a display in the second exemplary embodiment.

FIG. 13 is a schematic diagram illustrating a transition example of the UI screen displayed on display 20L. If the user selects start button 26f by input device 20M in a state of initial screen G11 of the three-dimensional information reconstraction processing being displayed on display 20L, display 20L displays a message of "processing" in screen G11.

First, feature point extractor 21 reads feature point groups 51 and 52 that are stored in feature point group retainer 28 and respectively grouped in specified corresponding point areas 26y1 and 26y2 (S21).

Display 20L displays specified corresponding point areas 26y1 and 26y2 and feature point groups 51 and 52 grouped in the areas of corresponding point areas 26y1 and 26y2 in an overlaid manner on first image 33 and second image 36 (screen G12).

Feature point extractor 21 makes an image acquisition request to first camera 10 and second camera 11 and acquires image data of new first image 33A and second image 36A respectively from first camera 10 and second camera 11 (S22). That is, for example, new image data is acquired in the case of change in the orientation of a camera or at the time of periodic calibration. The orientation of a camera may be changed by, for example, wind or vibration.

Feature point extractor 21 extracts each feature point respectively from first image 33A and second image 36A (S23).

Second corresponding point detector 22A searches for a correspondence of each feature point extracted by feature point extractor 21 with feature point groups 51 and 52 grouped in specified corresponding point areas 26$y$1 and 26$y$2. Second corresponding point detector 22A detects corresponding point areas 56$y$1 and 56$y$2 in new captured first image 33A and second image 36A (S24).

Display 20L displays original corresponding point areas 26$y$1 and 26$y$2 and new detected corresponding point areas 56$y$1 and 56$y$2 in an overlaid manner on new acquired first image 33A and second image 36A (screen G13).

Second corresponding point detector 22A searches for corresponding points 58$a$ and 58$b$ between new detected corresponding point areas 56$y$1 and 56$y$2 and outputs the corresponding point pair information (S25). Display 20L displays the corresponding point pair information in an overlaid manner on new acquired first image 33A and second image 36A (screen G14). Feature points may be re-extracted in corresponding point areas 56$y$1 and 56$y$2, and corresponding points 58$a$ and 58$b$ may be searched for with these feature points.

Camera parameter estimator 23 uses the corresponding point pair information generated in S25 to re-estimate the position and the pose, that is, the camera parameter (for example, translation vector p and rotation matrix R) of second camera 11 with respect to first camera 10. Furthermore, three-dimensional coordinate calculator 24 calculates the three-dimensional coordinates (X, Y, Z) of the target point in order based on the corresponding point pair information, the intrinsic parameter and the extrinsic parameter of first camera 10, the intrinsic parameter and the extrinsic parameter of second camera 11, and baseline length 62. The target point is included in corresponding point area 56$y$1.

Then, PC 20A proceeds to the process of S6 illustrated in FIG. 6 in the first exemplary embodiment, and abnormality detector 25 determines the presence or absence of abnormality in the three-dimensional coordinates of the target point. Subsequent processing is the same as at the time of initial setting and thus will not be described.

Accordingly, stereocamera system 5A retains the feature point group grouped in the corresponding point area that is specified once, and detects a corresponding point area by using the retained feature point group when respecifying the corresponding point area at another timing. Accordingly, the effort of the user respecifying the corresponding point area is reduced, and operation is simplified. The calibration operation can be more simplified.

Feature point group retainer 28 may group and store the feature point group included in the corresponding point area detected at the time of calibration and may enable the feature point group to be used in subsequent calibration.

In this case, feature point group retainer 28 may update the feature point group in the corresponding point area stored at the time of initial setting with the feature point group included in the corresponding point area detected at the time of calibration or may additionally store the feature point group included in the corresponding point area detected at the time of calibration without updating. Feature point group retainer 28 may retain each feature point included in the captured image captured at the time of initial setting or each feature point extracted at the time of calibration in addition to the grouped feature point group included in the specified corresponding point area.

(Modification Example)

The first and second exemplary embodiments illustrate first camera 10 and second camera 11 as being directly connected to PCs 20 and 20A through cables 18A and 18B. In a modification example, first camera 10 and second camera 11 are not directly connected to PC 20B, and data and signals are sent and received therebetween by communication that uses a sender and a receiver.

Figure 14:
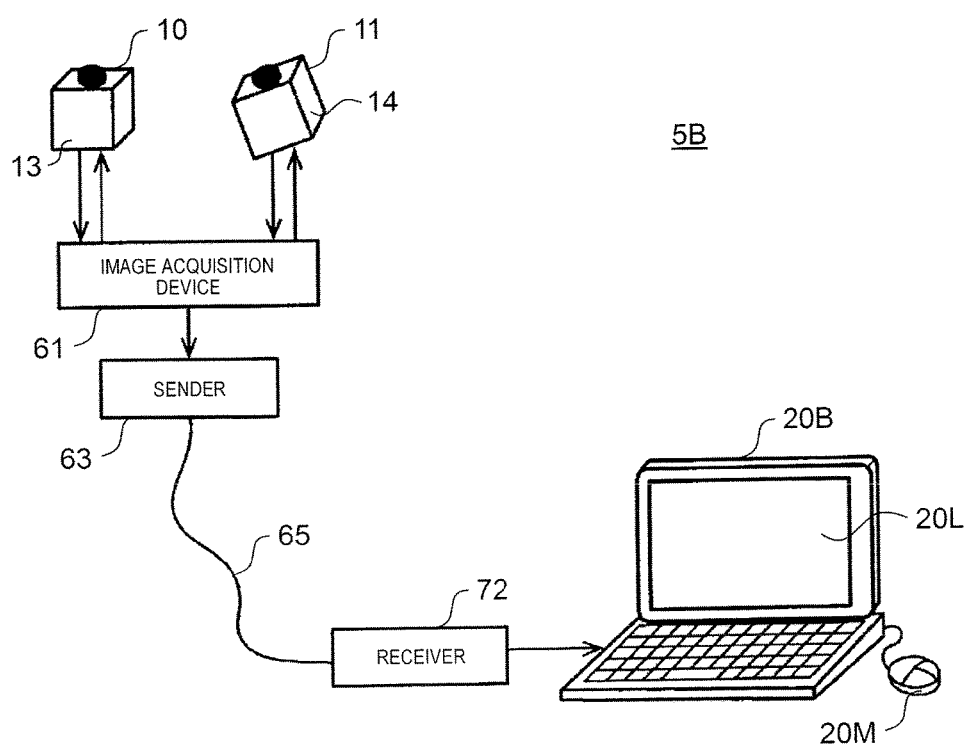
FIG. 14 is a schematic diagram illustrating a schematic configuration example of a stereocamera system in a modification example.

FIG. 14 is a schematic diagram illustrating a schematic configuration example of stereocamera system 5B in the modification example. Stereocamera system 5B is configured to include first camera 10, second camera 11, image acquisition device 61, sender 63, receiver 72, and PC 20B.

Image acquisition device 61 acquires image data of the first image captured by first camera 10 and the second image captured by second camera 11. Sender 63 sends the image data of the first image and the second image to receiver 72. Image acquisition device 61 and sender 63 may be integrated.

Image acquisition device 61 outputs an image acquisition request to first camera 10 and second camera 11 and acquires the image data of the first image captured by first camera 10 and the second image captured by second camera 11 approximately at the same time.

Receiver 72 receives the image data of the first image and the second image from sender 63. PC 20B performs the same operation as PC 20 and PC 20A. Receiver 72 and PC 20B may be integrated.

Communication that is performed between sender 63 and receiver 72 is not particularly limited and may be performed through a network such as the Internet, may be performed with a dedicated line without passing through a network, or may be performed wirelessly. Communication between sender 63 and receiver 72 is performed by using dedicated line 65.

In stereocamera system 5B, image acquisition device 61, in response to an image acquisition request from PC 20B, acquires the first image and the second image respectively from first camera 10 and second camera 11. Image acquisition device 61 transfers the image data of the acquired first image and the second image to PC 20B through sender 63 and receiver 72. Other operations are the same as the operations of the first and second exemplary embodiments.

According to stereocamera system 5B, PC 20B can perform initial setting and calibration in a location that is far away from the installation locations of first camera 10 and second camera 11. Therefore, after image acquisition device 61 is installed, calibration work is not necessarily be performed in the installation location, and efficient operation can be made.

(Third Exemplary Embodiment)

[Configuration and Like]

A schematic diagram illustrating a schematic configuration example of stereocamera system 5C in a present third exemplary embodiment is the same as the schematic diagram illustrating the schematic configuration example of stereocamera system 5 in the first exemplary embodiment, that is, FIG. 1. Stereocamera system 5C in the present third exemplary embodiment includes PC 20C instead of PC 20 included in stereocamera system 5 in the first exemplary embodiment. The same constituents in stereocamera system 5C of the present third exemplary embodiment as the first exemplary embodiment will be designated by the same reference signs, and descriptions thereof will not be provided or will be simplified.

Figure 15:
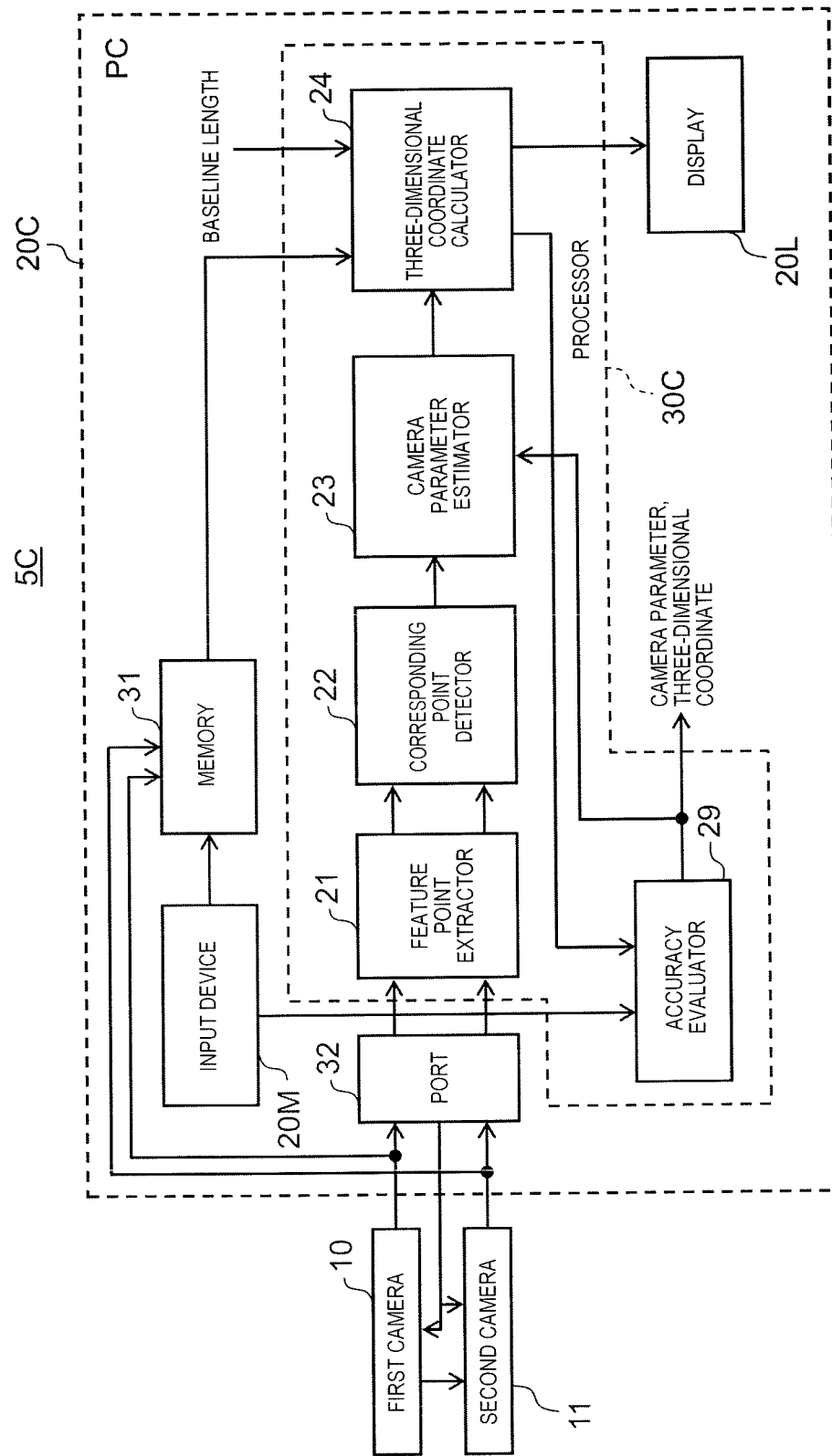
FIG. 15 is a block diagram illustrating a configuration example of a PC in a third exemplary embodiment.

FIG. 15 is a block diagram illustrating a configuration example of PC 20C in the third exemplary embodiment. PC 20C of stereocamera system 5C has processor 30C, input device 20M, memory 31, port 32, and display 20L.

Input device 20M inputs specification of corresponding points by the user and depth information (the distance from first camera 10 to the specified corresponding points). Input device 20M is configured to include a mouse, a keyboard, or the like. The depth information that is input through input device 20M is stored in memory 31 and is input into accuracy evaluator 29.

Memory 31 retains various types of data, information, and programs. Memory 31 stores, for example, the coordinates of the corresponding points that are specified (hereinafter, referred to as specified corresponding points), distance information to the specified corresponding points, peripheral images of the left and right specified corresponding points, and left and right camera images (the first image and the second image) at the time of corresponding point specification. The corresponding points exist as a pair in correspondence between the left and right camera images and thus are referred to as a corresponding point pair. The specified corresponding points are specified as a pair in correspondence between the left and right camera images and thus are referred to as a specified corresponding point pair.

Memory 31 is configured to include, for example, a memory such as a random access memory (RAM) or a read only memory (ROM) or a storage such as a hard disk drive (HDD) or a solid state drive (SSD).

Port 32 is communicably connected to first camera 10 and second camera 11, sends an image acquisition request to first camera 10 and second camera 11, and receives the image data of the first image sent from first camera 10 and the image data of the second image sent from second camera 11. Port 32 includes, for example, a communication port for communication with an external device or an external device connection port for connection of an external device.

Display 20L displays the first image captured by first camera 10 and the second image captured by second camera 11, displays corresponding points, an error message, guidance, and the like in an overlaid manner on these images, and displays a three-dimensionally restored image. Display 20L is configured to include a display device such as a liquid crystal display.

Input device 20M and display 20L may be configured as separate devices or may be configured to be integrated as a touch panel.

Processor 30C executes a program retained in memory 31 to realize each function of feature point extractor 21, corresponding point detector 22, camera parameter estimator 23, three-dimensional coordinate calculator 24, and accuracy evaluator 29.

Processor 30C is configured to include, for example, a central processing unit (CPU), a digital signal processor (DSP), or a graphical processing unit (GPU).

Feature point extractor 21 acquires, in order, and analyzes the first image captured by first camera 10 and the second image captured by second camera 11 that are input from port 32.

First camera 10 is, for example, a camera that captures a left camera image of the subject and is disposed on the left side of FIG. 1. Second camera 11 is, for example, a camera that captures a right camera image of the subject and is disposed on the right side of FIG. 1.

Feature point extractor 21 has function as an image acquirer and detects a feature point (for example, a point in an area having strong edges) in the acquired left camera image and the right camera image in order. Detection of the feature point uses, for example, an algorithm of extracting a local feature point that is invariant with respect to enlargement, shrinkage, or rotation of an image. The algorithm includes, for example, scale-invariant feature transform (SIFT) and speed-up robust features (SURF).

A schematic diagram for describing one example of a parameter for derivation of the three-dimensional coordinates is the same as FIG. 3 in the first exemplary embodiment. In the present third exemplary embodiment, the intrinsic parameter and information of baseline length 62 are acquired from a camera through port 32 and retained in memory 31.

Accuracy evaluator 29 evaluates the accuracy of the three-dimensional coordinates calculated by three-dimensional coordinate calculator 24. The accuracy evaluation is performed by using the Z coordinate of the corresponding point (specified corresponding point) specified by the user through input device 20M.

For example, accuracy evaluator 29 receives input of the Z coordinate of the specified corresponding point, that is, the distance from first camera 10 to specified corresponding point am (depth value), from input device 20M. Accuracy evaluator 29 compares the input distance with the Z coordinate (distance) of specified corresponding point am calculated by three-dimensional coordinate calculator 24. In consequence of the comparison, accuracy evaluator 29 determines the calculation result of the three-dimensional coordinates to be successful in the case of an error (difference) being less than or equal to a specified value (for example, 10%), and determines the calculation result of the three-dimensional coordinates to be failed in the case of the error exceeding the specified value. The specified value can be set to any value by the user.

The value of the Z coordinate (depth value) is illustratively used as the distance information from first camera 10 to specified corresponding point am. Instead, for example, in the case of first camera 10 and specified corresponding point am not being on the same Z axis, the actual distance between first camera 10 and specified corresponding point am may be used as the distance information.

In the case of the calculation result of the three-dimensional coordinates being failed, camera parameter estimator 23 randomly reselects a predetermined number of corresponding points different from the previous corresponding points from many corresponding points detected by corresponding point detector 22. Three-dimensional coordinate calculator 24 uses the selected predetermined number of corresponding points to recalculate the Z coordinate of the specified corresponding point. Accuracy evaluator 29 uses the recalculated Z coordinate value of the specified corresponding point to perform the same determination as above. In the case of the determination result being failed a predetermined number of times, the user may specify other corresponding points and perform an input operation of the depth information.

[Operation Example]

Next, an operation example of stereocamera system 5C will be described.

Figure 16:
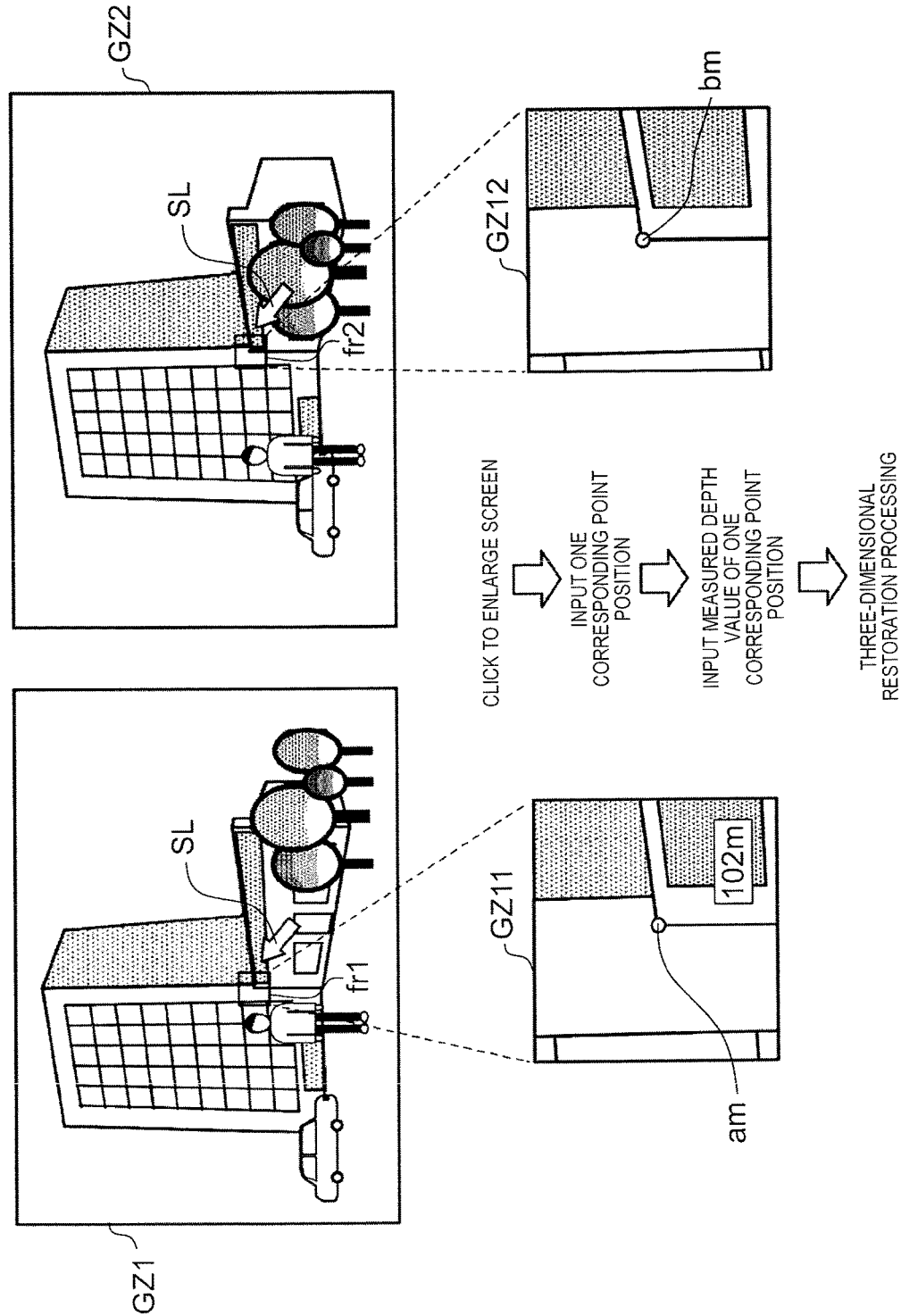
FIG. 16 is a diagram describing one example of a summary of operation of the stereocamera system.

FIG. 16 is a diagram describing a summary of operation of stereocamera system 5C. Display 20L displays first image GZ1 captured by first camera 10 and second image GZ2 captured by second camera 11. If the user operates input device 20M to move cursor SL near the corresponding points and performs a click operation in first image GZ1 and second image GZ2 displayed in the screen of display 20L, parts enclosed by frames fr1 and fr2 are displayed in an enlarged manner on the screen.

Displaying images GZ11 and GZ12 near the corresponding points (hereinafter, referred to as peripheral images) in an enlarged manner on the screen allows the user to easily specify the corresponding points included in the images. For example, the user, through input device 20M, specifies corresponding point am included in enlarged peripheral image GZ11 and specifies corresponding point bm included in enlarged peripheral image GZ12. Furthermore, the user inputs the depth information (the distance from first camera 10 to corresponding point am) through input device 20M. The depth information may be the distance from second camera 11 to corresponding point bm. The depth information is an actual measured value that is measured by using, for example, a laser rangefinder or a measure. In FIG. 16, "102 m" is input as the actual measured value and is displayed in the screen of display 20L in an overlaid manner on enlarged peripheral image GZ11.

If the user finishes specification and inputting, processor 30C performs the three-dimensional reconstraction processing based on those pieces of information. In consequence of the processing, a three-dimensionally restored image is displayed on display 20L.

Figure 17:
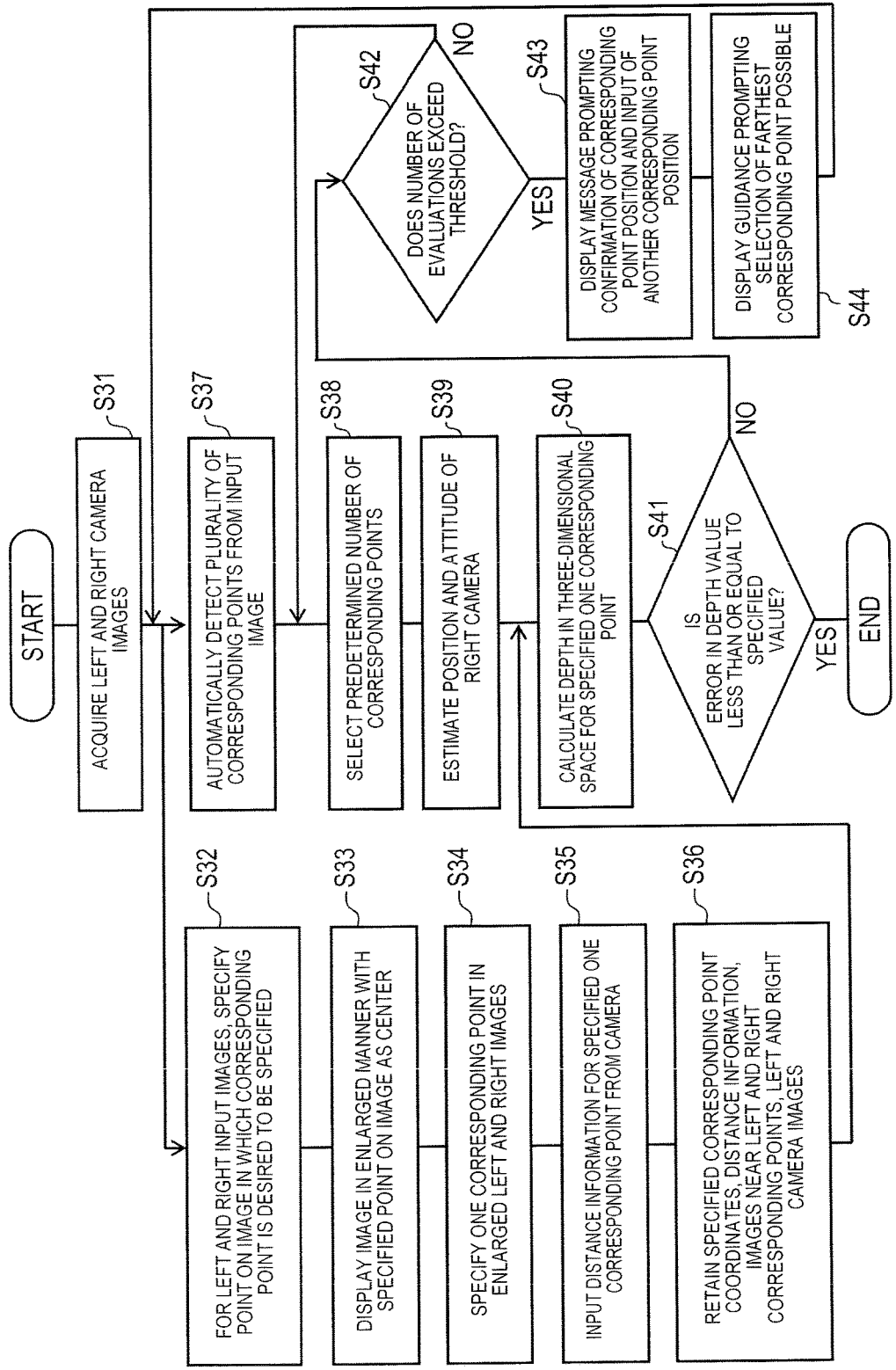
FIG. 17 is a flowchart illustrating one example of initial calibration performed at the time of initial setting.

FIG. 17 is a flowchart illustrating one example of initial calibration performed at the time of initial setting.

If initial calibration is started, first, feature point extractor 21 makes an image acquisition request to first camera 10 and second camera 11 through port 32 and acquires image data of first image GZ1 and second image GZ2 respectively from first camera 10 and second camera 11 (S31). The image data may be periodically acquired without an image acquisition request made.

Input device 20M, for first image GZ1 and second image GZ2 acquired in S31, receives a point that is specified by the user and is on the image desired for specification of the corresponding point (S32).

If the user performs a click operation on the image, processor 30C displays, in an enlarged manner, the peripheral image with the point specified with cursor SL on the image displayed on display 20L as a center (S33).

Input device 20M, for enlarged peripheral images GZ11 and GZ12, receives corresponding points (specified corresponding points) am and bm that are specified by the user (S34). With corresponding points am and bm, information of the coordinates (one example of position information) of corresponding points am and bm are acquired. The specified corresponding point may be a point included in a plurality of corresponding points detected by corresponding point detector 22 or a point not included therein.

Input device 20M receives the distance information (depth value) from first camera 10 to specified corresponding point am input by the user (S35).

Processor 30C stores (retains), in memory 31, first image GZ1 and second image GZ2 (left and right camera images) that are input from input device 20M and in which the coordinates of the specified corresponding points, the distance information, peripheral images GZ11 and GZ12, and the corresponding points are specified (S36).

Along with the processes of S32 to S36, feature point extractor 21 extracts a plurality of feature points from each of first image GZ1 and second image GZ2. Corresponding point detector 22 detects, from similarity of the feature points extracted by feature point extractor 21, a plurality (for example, approximately 100) of corresponding points representing a correspondence between first image GZ1 and second image GZ2 and outputs the corresponding point pair information (image coordinate pair information) representing the correspondence (S37).

Figure 18:
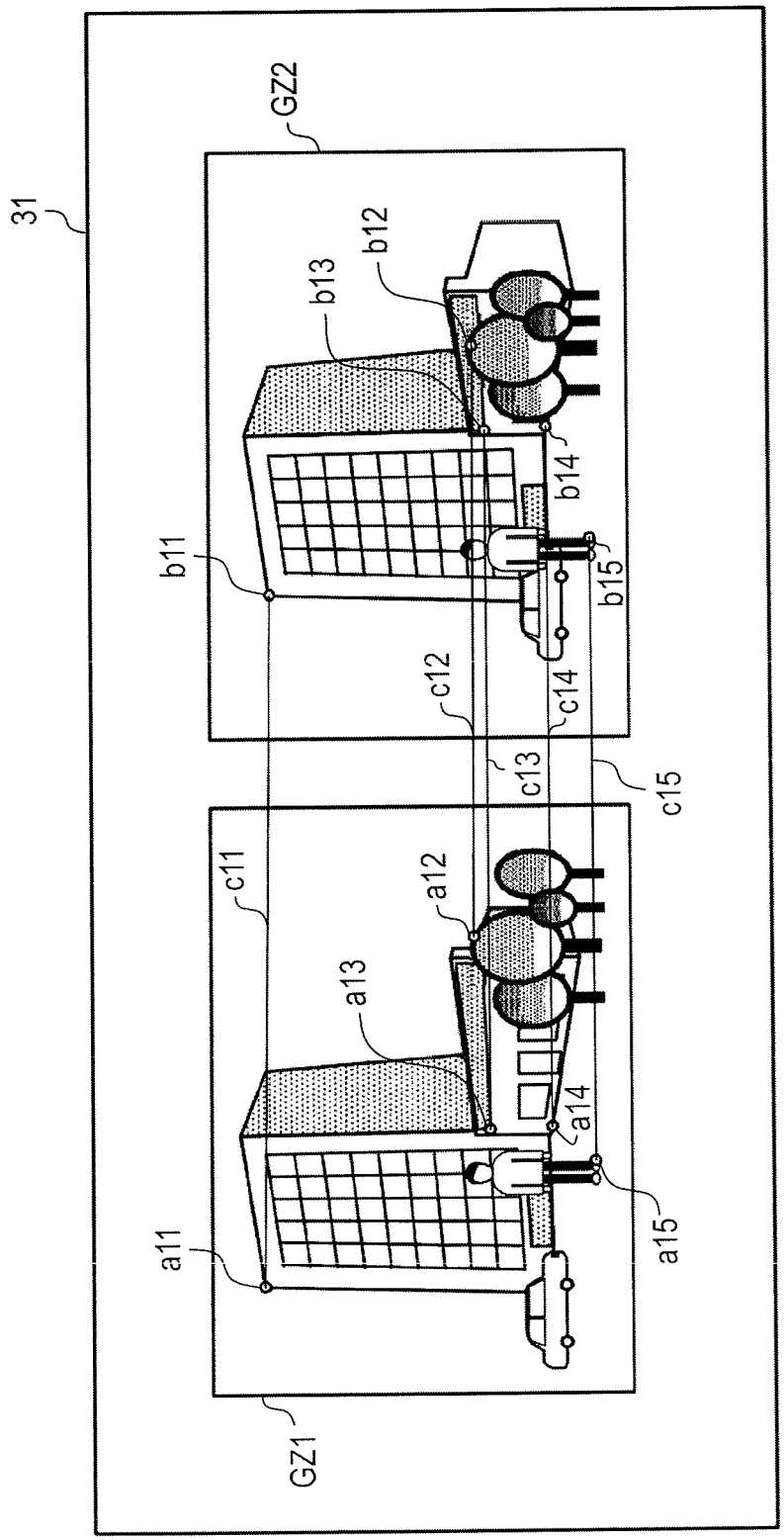
FIG. 18 is a diagram illustrating a screen example in which a plurality of corresponding points as candidates for specification of corresponding points and correspondence lines connecting the plurality of corresponding points are drawn in left and right images.

FIG. 18 is a diagram illustrating a screen in which a plurality of corresponding points a11 to a15 and b11 to b15 as candidates for specification of corresponding points am and bm and correspondence lines c11 to c15 connecting the corresponding points are drawn in the left and right images (first image GZ1 and second image GZ2).

Display 20L displays first image GZ1, second image GZ2, corresponding points a11 to a15 and b11 to b15, and correspondence lines c11 to c15.

Corresponding point detector 22 randomly selects a predetermined number (for example, approximately five) of corresponding points from the detected plurality (for example, approximately 100) of corresponding points (S38). In the selection of the corresponding points, for example, a corresponding point that is used when the error is determined to exceed a specified value in accuracy evaluation by accuracy evaluator 29 described later is excluded.

Camera parameter estimator 23 estimates the position and the pose of second camera 11 with respect to first camera 10 based on the corresponding point pair information of the corresponding points selected from the plurality of corresponding points, the focal length of first camera 10, the focal length of second camera 11, the optical axis coordinates of first camera 10, and the optical axis coordinates of second camera 11 (S39).

Three-dimensional coordinate calculator 24, based on the corresponding point pair information of one specified corresponding point (specified corresponding point) am or bm, the intrinsic parameter and the extrinsic parameter of first camera 10, the intrinsic parameter and the extrinsic parameter of second camera 11, and baseline length 62, calculates the three-dimensional coordinates (X, Y, Z) of the target point corresponding to specified corresponding point am and acquires the depth value (Z coordinate value) to the target point (S40). The target point is, as described above, a point to which the feature point of first image GZ1 included in the corresponding point pair is inverse-projected.

Accuracy evaluator 29 uses the depth value calculated in S40 and the depth value input in S35 to determine whether or not the error of the difference between the depth values is less than or equal to a specified value (for example, 10%) (S41). In the case of the error being less than or equal to the specified value, accuracy evaluator 29 finishes the present processing, considering that the accuracy evaluation is proper and that the calculation result of the three-dimensional coordinates is successful.

In the case of the error exceeding (being greater than or equal to) the specified value in S41 accuracy evaluator 29 determines whether or not the number of accuracy evaluations exceeds a threshold (S42). In the case of the number of accuracy evaluations not exceeding the threshold, processor 30C returns to the process of S38, selects a predetermined number of new corresponding points, and repeats the same processing.

In the case of the number of accuracy evaluations exceeding the threshold, processor 30C displays, in the screen of display 20L, error message ms1 that prompts confirmation of corresponding point error and the positions of the corresponding points and input of the positions of other corresponding points (S43).

Figure 19:
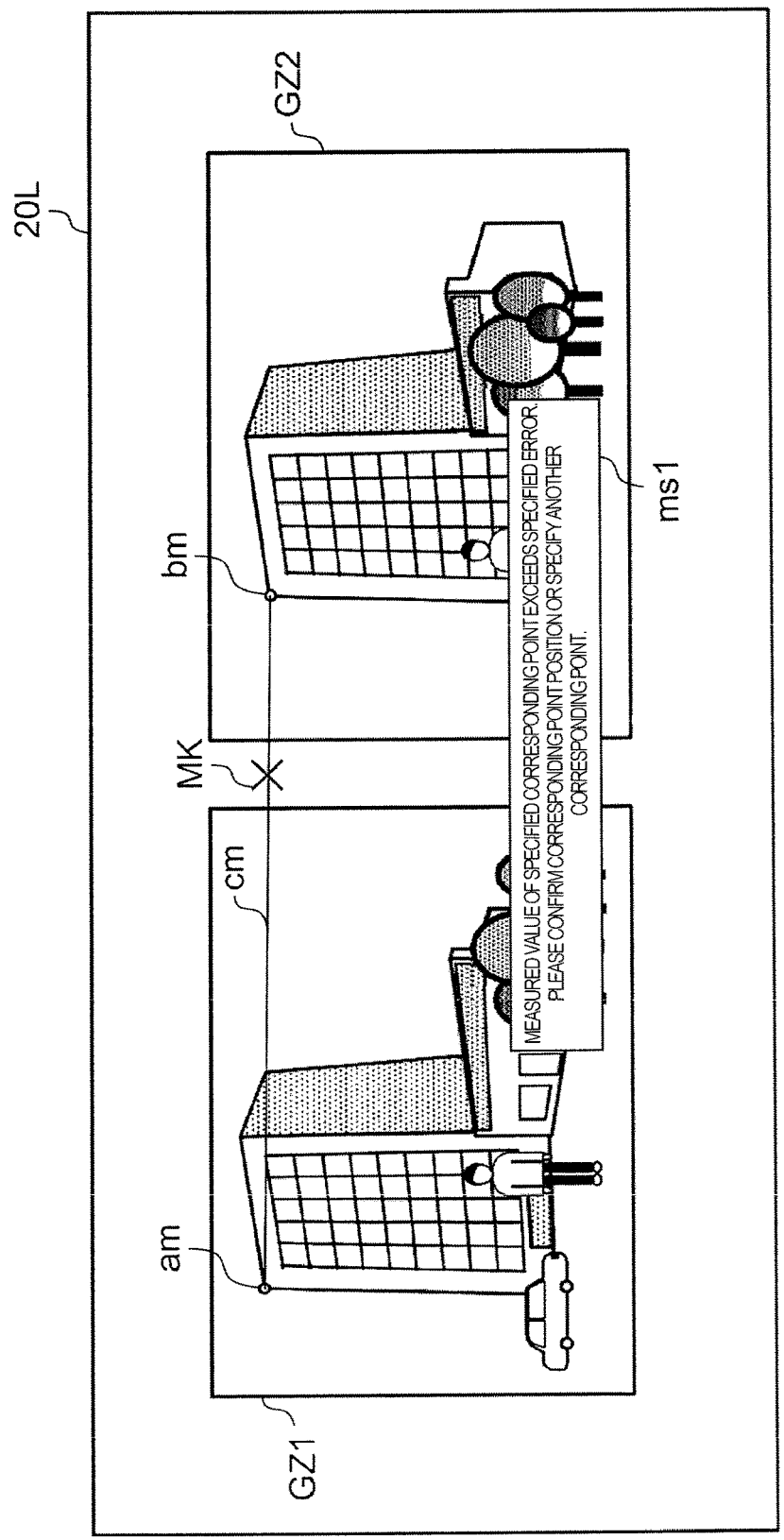
FIG. 19 is a diagram illustrating a screen example in which an error message and a mark for corresponding points are added in the screen of FIG. 18.

FIG. 19 is a diagram illustrating a screen in which error message ms1 and mark MK for the corresponding points are added in the screen of FIG. 18. Error message ms1 (alert information) of, for example, "The actual measured values of the specified corresponding points exceed the specified error. Please confirm the positions of the corresponding points or specify other corresponding points." is displayed in the screen of display 20L. In FIG. 19, corresponding points a11 and b11 are set to specified corresponding points am and bm, and mark MK (for example, × mark) representing error is displayed on correspondence line cm that connects corresponding points am and bm.

The inventor or the like previously confirms that specifying far corresponding points that correspond to a target point far away from first camera 10 improves the accuracy of three-dimensional information reconstruction. Based on this fact, processor 30C displays, in the screen of display 20L, guidance ms2 that prompts specification of far points (S44).

Figure 20:
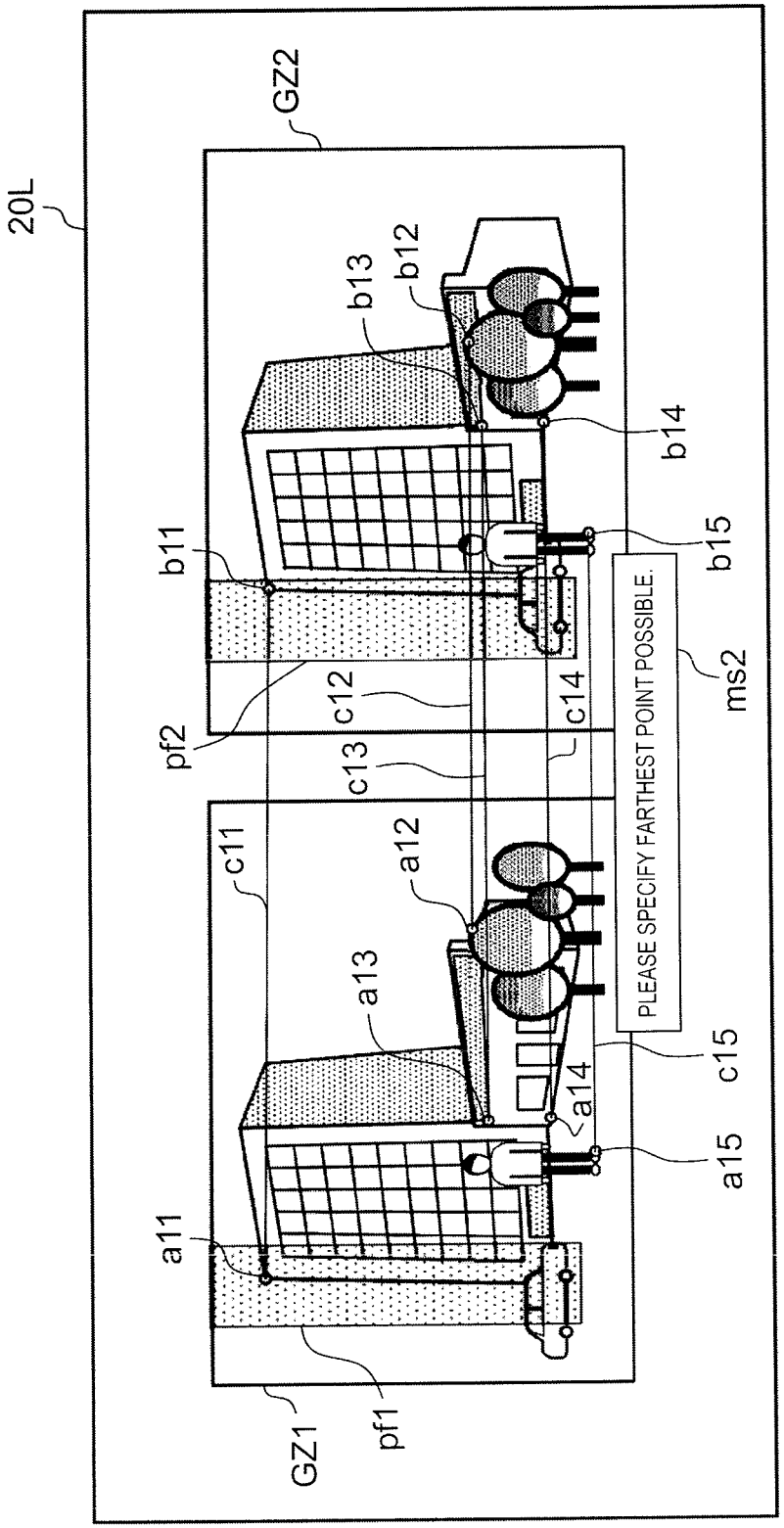
FIG. 20 is a diagram illustrating a screen example in which guidance is added in the screen of FIG. 18 to specify far points as corresponding points.

FIG. 20 is a diagram illustrating a screen in which guidance ms2 is added in the screen of FIG. 18 to specify far points as the corresponding points. Guidance ms2 (guide information) of, for example, "Please specify the farthest points possible" is displayed in the screen of display 20L. Furthermore, rectangular frames pf1 and pf2 that enclose far corresponding points are displayed in the screen of display 20L.

Accordingly, specification of far corresponding points included in rectangular frames pf1 and pf2 that is expected to improve the accuracy of reconstruction of three-dimensional information is prompted. Thus, the user can easily specify appropriate corresponding points as candidates in rectangular frames pf1 and pf2. The process of S44 is an optionally performed process and may not be performed. Then, processor 30C returns to the processes of S32 and S37 and performs the same processing.

In the case of the accuracy evaluation being determined to be proper, three-dimensional coordinate calculator 24 performs the three-dimensional reconstruction processing that calculates the three-dimensional coordinates (X, Y, Z) of the target point in order based on the corresponding point pair information, the intrinsic parameter and the extrinsic parameter of first camera 10, the intrinsic parameter and the extrinsic parameter of second camera 11, and baseline length 62. Processor 30C displays, in the screen of display 20L, the target point that is subjected to the three-dimensional reconstraction processing.

According to the processing of FIG. 17, a predetermined number of corresponding points are randomly selected from the detected corresponding points in S38, and information of the selected corresponding points is used to estimate the position and the pose of second camera 11 with respect to first camera 10. Thus, estimation results for the position and the pose are different for each selection of the corresponding points. Thus, estimation accuracy for the position and the pose is different. Thus, the accuracy of three-dimensional reconstruction may be low or may be high according to selection of the corresponding points.

Regarding this point, PC 20C performs three-dimensional reconstruction by using the corresponding points in the case of estimation accuracy for the position and the pose being greater than or equal to a predetermined reference, that is, in the case of the error between the actual measured value and the calculated value of the distance information being less than or equal to a predetermined extent (for example, minimum). Thus, reconstraction accuracy for the three-dimensional coordinates can be stably improved.

[Effect and Like]

Estimation accuracy for three-dimensional reconstruction may be low in the case of not inputting, by input device 20M, the position of any corresponding point of a plurality of corresponding points or the distance information from a camera to above any corresponding point, that is, in the case of automatically detecting all corresponding points and acquiring the distance information related to all corresponding points by calculation. For example, even if the corresponding points are detected, derivation accuracy for the distance information of the corresponding points may be low.

Regarding this point, in PC 20C of stereocamera system 5C of the third exemplary embodiment, port 32 acquires first image GZ1 captured by first camera 10 and second image GZ2 captured by second camera 11. Processor 30C detects a plurality of corresponding points including corresponding points am and bm to which feature point a in first image GZ1 and feature point b in second image GZ2 correspond. Processor 30C, based on a plurality of corresponding points am and bm, reconstructs three-dimensional coordinates to which feature point a is inverse-projected. Input device 20M inputs the coordinates (one example of position information) of corresponding point am specified from the plurality of corresponding points by the user and the depth value (one example of distance information) from first camera 10 to corresponding point am input by the user. Processor 30C recalculates reconstruction of the three-dimensional coordinates after input of the coordinates of corresponding point am and the depth value.

Corresponding point am that is specified by input device 20M may be included in the plurality of detected corresponding points or may not be included therein. That is, input device 20M, with any corresponding point pair in first image GZ1 and second image GZ2 as a specified corresponding point pair, inputs position information of the specified corresponding point pair in first image GZ1 and the second image GZ2 and distance information indicating the distances from first camera 10 to the specified corresponding point pair.

Accordingly, reconstruction of the three-dimensional coordinates of the specified corresponding points is recalculated based on the positional coordinates of the corresponding point pair (one example of a second corresponding point pair) specified by the user and the depth values from first camera 10 to the specified corresponding points input by the user. Therefore, PC 20C can evaluate the accuracy of the restored three-dimensional coordinates and can improve reconstruction accuracy for the three-dimensional coordinates restored from two captured images. Since only a small number (for example, one) of corresponding points are required to be specified, the accuracy of reconstruction of the three-dimensional coordinates can be improved without making a user operation complicated.

Display 20L, under control of processor 30C, may display candidates of a plurality of corresponding points a11 to a15 and b11 to b15 in an overlaid manner on at least one of first image GZ1 and second image GZ2.

Accordingly, the user easily specifies the corresponding points from the plurality of corresponding points of candidates displayed on display 20L. Therefore, operability of PC 20C is improved.

Display 20L, under control of processor 30C, may display guidance (one example of guide information) ms2, in at least one of first image GZ1 and second image GZ2, that prompts specification of the corresponding points by prioritizing a position having a long distance from first camera 10.

Accordingly, the user is prompted to specify far corresponding points with which the accuracy of restoration of the three-dimensional coordinates is expected to be improved. Thus, the user easily specifies appropriate corresponding points from the plurality of candidates.

Processor 30C may determine whether or not to recalculate reconstruction of the three-dimensional coordinates based on the depth value input by input device 20M and information of the distance from first camera 10 to specified corresponding point am (Z coordinate value) acquired by reconstruction of the three-dimensional coordinates.

Accordingly, PC 20C determines the accuracy of reconstraction of the three-dimensional coordinates to be low in the case of, for example, the input depth value to the target point being significantly different from the depth value to the restored target point, and can reduce processing load due to recalculation without recalculating reconstruction of the three-dimensional coordinates.

Display 20L, under control of processor 30C, displays error message ms1 related to input of the specified corresponding points in the case of the difference between the depth value input by input device 20M and information of the distance from first camera 10 to specified corresponding point am acquired by reconstruction of the three-dimensional coordinates being greater than or equal to a predetermined value (specified value). Error message ms1 is one example of alert information.

Accordingly, the user can easily confirm degradation of reconstruction of the three-dimensional coordinates and, for example, can smoothly input other corresponding points.

The present exemplary embodiment illustrates PC 20C as performing the processes of S37 to S40 along with the processes of S32 to S36 in FIG. 17. The processes of S37 to S40 may be performed after the processes of S32 to S36 are performed, or the processes of S32 to S36 may be performed after the processes of S37 to S40 are performed.

(Fourth Exemplary Embodiment)

The third exemplary embodiment illustrates initial calibration that is performed at the time of initial setting of the stereocamera system. A fourth exemplary embodiment will illustrate calibration performed at the time of operation, that is, recalibration that is performed after installation of the stereocamera system. Recalibration is performed, for example, periodically, in the case of the restored three-dimensional image being distorted, or in the case of occurrence of a natural disaster such as a cyclone or an earthquake. The fourth exemplary embodiment assumes that the same initial calibration as the third exemplary embodiment is previously performed.

The same constituents in stereocamera system 5D of the fourth exemplary embodiment as the third exemplary embodiment will be designated by the same reference signs, and descriptions thereof will not be provided or will be simplified.

[Configuration and Like]

Figure 21:
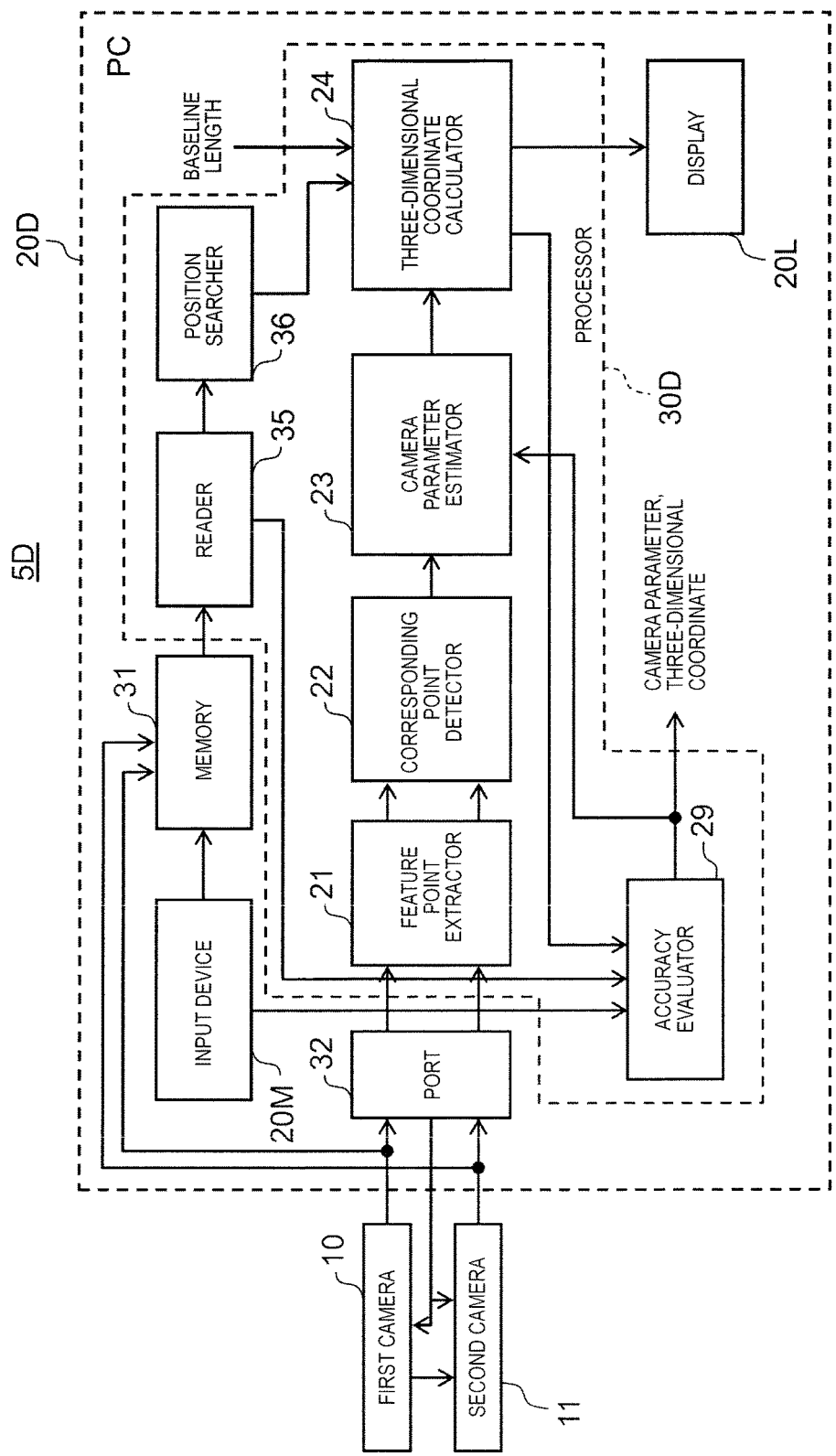
FIG. 21 is a block diagram illustrating a configuration example of a PC in a fourth exemplary embodiment.

FIG. 21 is a block diagram illustrating a configuration example of PC 20D in the fourth exemplary embodiment. PC 20D includes the configuration of PC 20C of the third exemplary embodiment and has reader 35 and position searcher 36.

Processor 30D executes a program retained in memory 31 to realize each function of reader 35 and position searcher 36.

Reader 35 reads specification information (for example, the specified corresponding point coordinates and the distance information) and image information (for example, first image GZ1, second image GZ2, and peripheral images GZ11 and GZ12) stored in memory 31.

Position searcher 36 searches whether or not peripheral images GZ11 and GZ12 at the time of initial setting (or at the time of previous calibration) are in first image GZ3 and second image GZ4 that are captured at the time of recalibration. This search is performed by, for example, template matching that detects areas of high similarity by moving peripheral images GZ11 and GZ12 as templates respectively in first image GZ3 and second image GZ4.

[Operation and Like]

Figure 22:
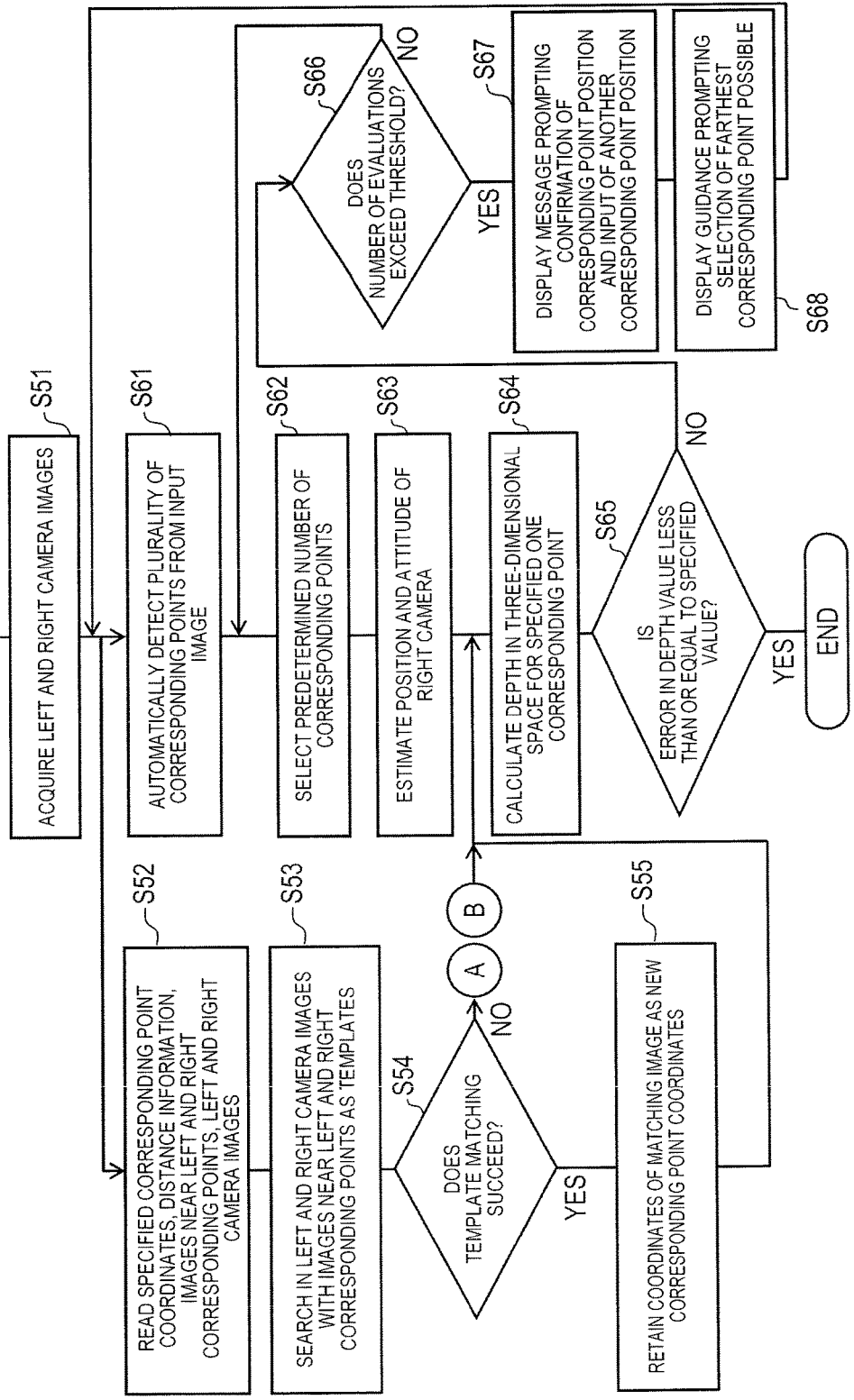
FIG. 22 is a flowchart illustrating one example of recalibration performed at the time of operation.
Figure 23:
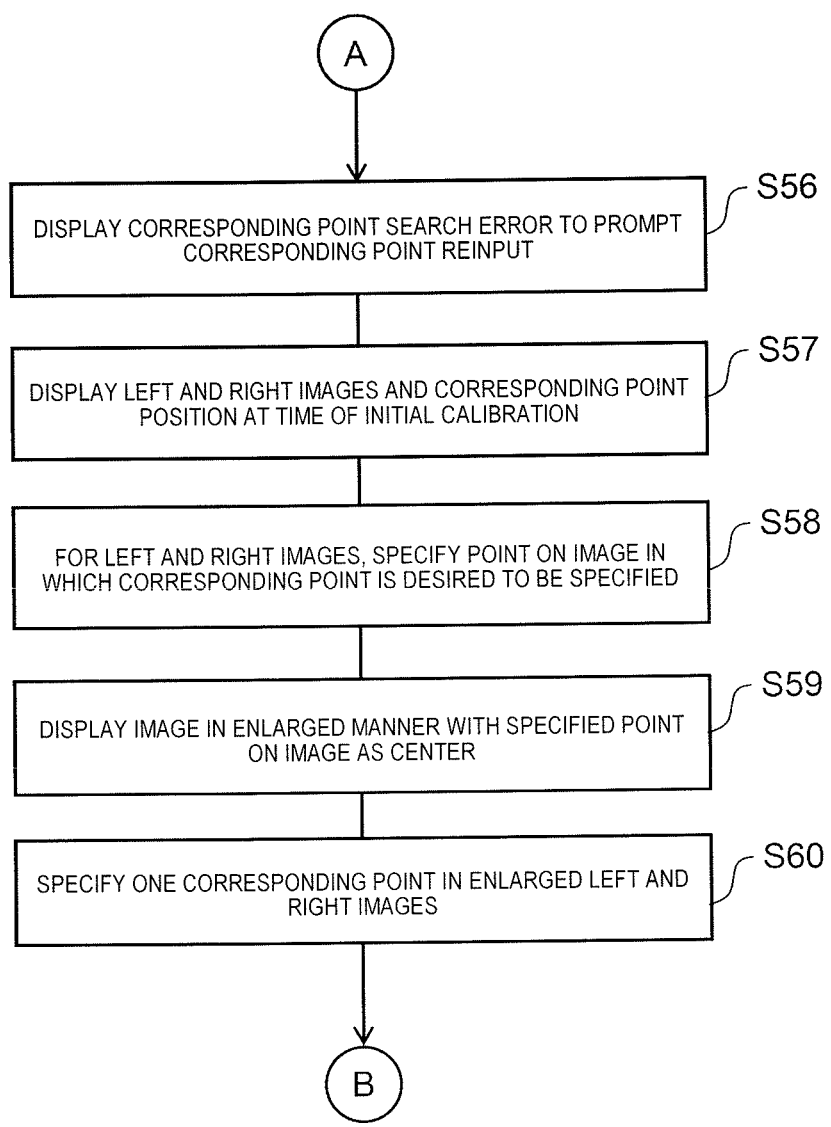
FIG. 23 is a flowchart illustrating one example of recalibration performed at the time of operation continued from FIG. 22.

FIG. 22 and FIG. 23 are flowcharts illustrating one example of recalibration performed at the time of operation.

In the same manner as the process of S31 in initial calibration, port 32 acquires image data of first image GZ3 and second image GZ4 respectively from first camera 10 and second camera 11 (S51).

Reader 35 reads the specification information and the image information stored in memory 31 (S52).

Position searcher 36 performs template matching for first image GZ3 and second image GZ4 captured in S51 with peripheral images GZ11 and GZ12 read by reader 35 as templates. Position searcher 36 searches first image GZ3 and second image GZ4 for area images PGZ3 and PGZ4 (refer to FIG. 24) that match peripheral images GZ11 and GZ12 (S53).

Position searcher 36 determines whether or not template matching is successful (S54).

Figure 24:
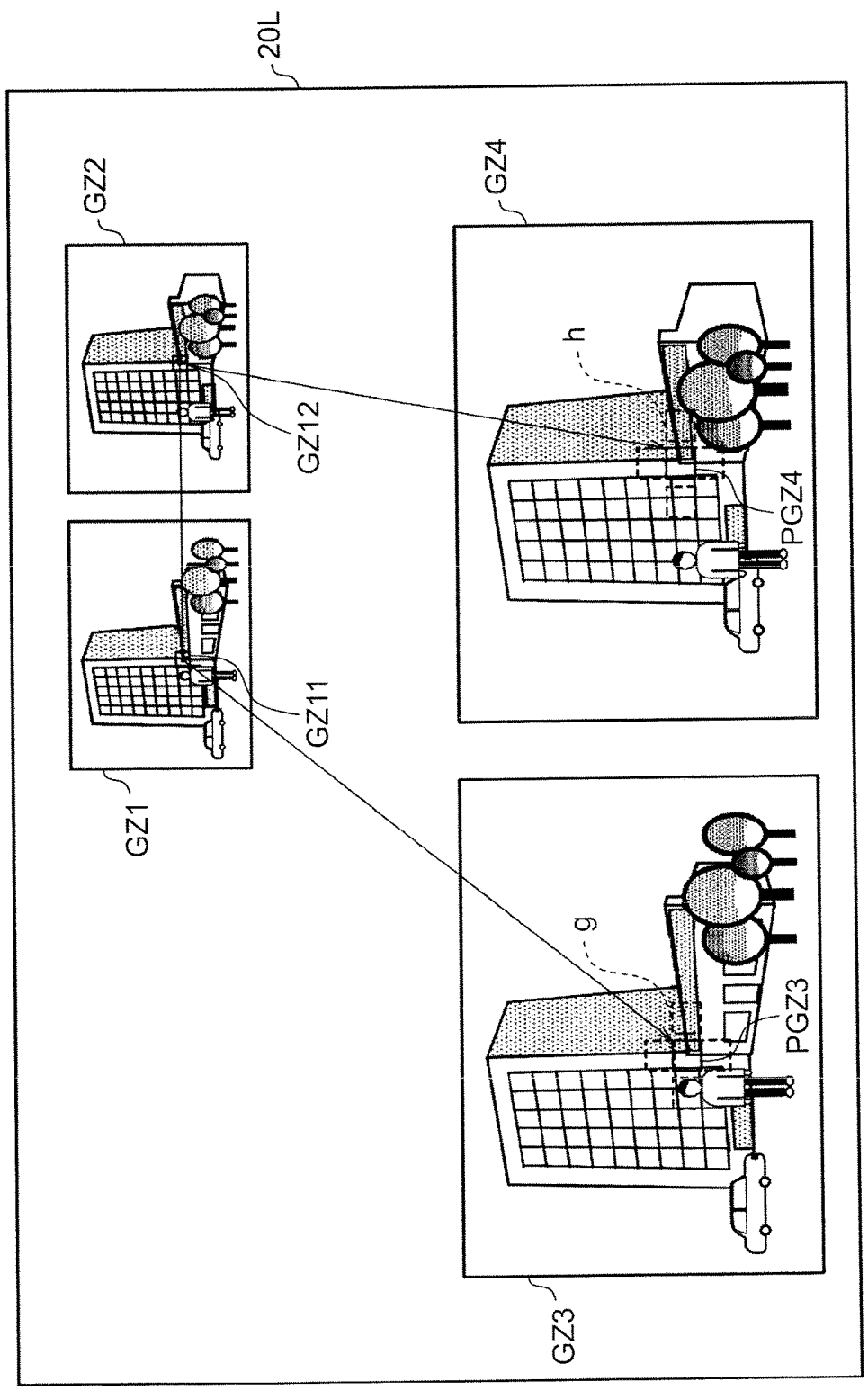
FIG. 24 is a diagram illustrating a screen example in which template matching is performed at the time of recalibration.

FIG. 24 is a diagram illustrating a screen in which template matching is performed at the time of recalibration. Processor 30D displays a template matching operation in the screen of display 20L. In template matching, performed is searching for whether or not peripheral image GZ11 and peripheral image GZ12 are included in first image GZ3 and second image GZ4 as respectively illustrated by dotted line frames g and h in the drawing. Determination as to whether peripheral image GZ11 and peripheral image GZ12 respectively match area image PGZ3 included in first image GZ3 and area image PGZ4 included in second image GZ2 is performed. In the case of only one matching or in the case of both not matching, template matching is determined to be failed.

In the case of template matching being successful, position searcher 36 retains matching area image PGZ3 and area image PGZ4 in memory 31 respectively as new peripheral image GZ11 and peripheral image GZ12 and retains the center coordinates of area image PGZ3 and the center coordinates of area image PGZ4 respectively as the coordinates of specified corresponding points am and bm (S55).

In the case of template matching being failed in S54, processor 30D displays corresponding point search error in the screen of display 20L to prompt reinput of the corresponding points (S56).

Figure 25:
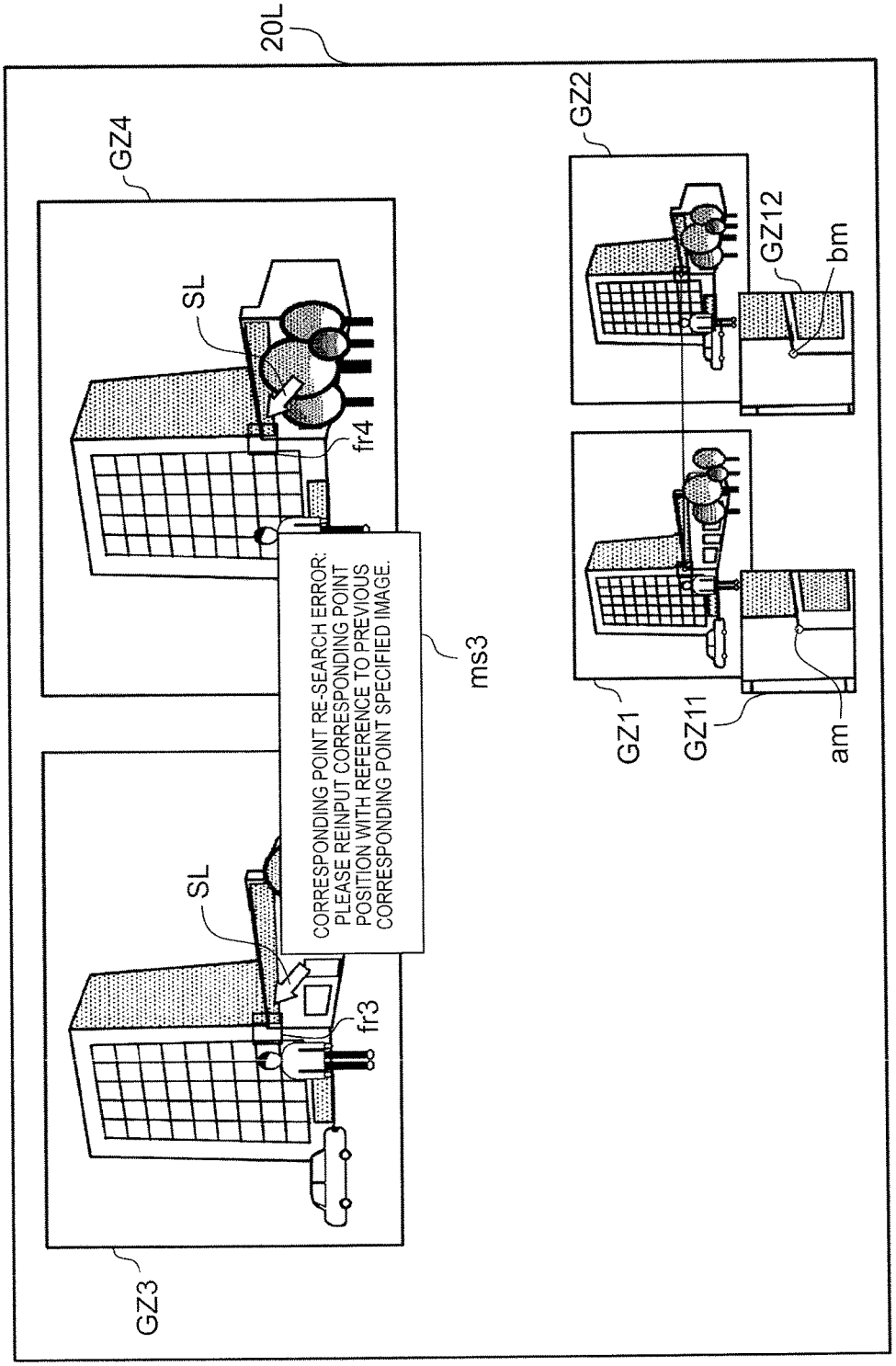
FIG. 25 is a diagram illustrating a screen example in which guidance for corresponding point re-search and the like are added.

FIG. 25 is a diagram illustrating a screen in which guidance ms3 and the like for corresponding point re-search are added. Guidance ms3 (guide information) of, for example, "Corresponding point re-search error: Please reinput the corresponding point position with reference to the previous corresponding point specified image." is displayed in the screen of display 20L.

Furthermore, processor 30D may display previous first image GZ1 and second image GZ2 and peripheral image GZ11 and peripheral image GZ12 respectively including corresponding points am and bm in a shrunk manner, for example, at the lower right corner of the screen of display 20L (S57).

Input device 20M receives the corresponding points specified with cursor SL by a user operation in first image GZ3 and second image GZ4 (S58). If the user performs a click operation on the image, processor 30D displays, in an enlarged manner, the peripheral image with the point specified with cursor SL on the image displayed on display 20L as a center (S59).

Input device 20M receives new corresponding points specified by the user in enlarged peripheral images GZ11 and GZ12 (S60). The distance information (depth value) is input at the time of initial calibration and retained in memory 31. Thus, an input operation for the depth value may not be performed.

Then, the processes of S61 to S68 are the same as the processes of S37 to S44 in the third exemplary embodiment. Thus, the subsequent processing will not be described.

In the case of displaying an error message prompting input of another corresponding point position in S67, the same display as in FIG. 25 may be performed. That is, processor 30D, in the screen of display 20L, for example, may display guidance ms3 (guide information) and display previous first image GZ3 and second image GZ4 and peripheral image GZ11 and peripheral image GZ12 including corresponding points am and bm in a shrunk manner at the lower right corner of the screen of display 20L.

[Effect and Like]

Accordingly, in PC 20D of stereocamera system 5D of the fourth exemplary embodiment, processor 30D performs calibration (one example of reconstraction processing) including reconstraction of the three-dimensional coordinates a plurality of number of times. In initial calibration (one example of first reconstraction processing), processor 30D retains, in memory 31, the position information of specified corresponding points am and bm input by input device 20M, the depth values, first image GZ1 captured by first camera 10 in initial calibration, and peripheral image GZ11 including specified corresponding point am.

In recalibration (one example of second reconstraction processing) that is performed at the time of operation (subsequent to initial calibration), processor 30D detects area image PGZ3 that corresponds to peripheral image GZ11 in first image GZ3 captured by first camera 10 in recalibration. Processor 30D sets, to specified corresponding point am in recalibration, the specified corresponding point that is included in area image PGZ3 and acquired by initial calibration. Processor 30D recalculates reconstraction of the three-dimensional coordinates after setting specified corresponding point am.

Accordingly, PC 20D, at the time of recalibration, can use the coordinates of the specified corresponding points, the depth values, and the template images at the time of initial calibration. Therefore, the same operation as initial calibration is not required to be performed in recalibration, and user operations or processing of the processor at the time of recalibration can be reduced. Thus, PC 20D can effectively use the coordinates of the specified corresponding points, the depth values, and the template images that are acquired once, and can easily improve reconstraction accuracy for the three-dimensional coordinates restored from two captured images. The same applies in the case of performing current recalibration for not only initial calibration but also previous recalibration.

Display 20L, under control of processor 30D, may display the coordinates of specified corresponding point am and peripheral image GZ11 retained in memory 31 in the case of area image PGZ3 corresponding to peripheral image GZ11 in first image GZ1 not being detected in recalibration or in the case of the difference between the depth value retained in memory 31 and information of the distance from first camera 10 to specified corresponding point am acquired by recalibration being greater than or equal to a specified value.

Accordingly, in the case of recalibration being failed, the user can respecify the corresponding points while viewing the position information of specified corresponding point am and peripheral image GZ11 displayed in the screen of display 20L. Therefore, PC 20D can execute recalibration with high reconstraction accuracy for the three-dimensional coordinates.

Display 20L may display guidance ms3 that prompts input of the position of specified corresponding point am in first image GZ3 in recalibration by referencing the position information of specified corresponding point am and peripheral image GZ11 stored in memory 31. Guidance ms3 is one example of guide information.

Accordingly, the user can simply respecify the corresponding points in accordance with guidance ms3 that prompts specification of the corresponding points. Therefore, operability of PC 20D is improved.

(Other Exemplary Embodiments)

The first to fourth exemplary embodiments are described heretofore as illustrations of the technology in the present disclosure. However, the technology in the present disclosure is not limited thereto and can also be applied to exemplary embodiments subjected to modification, replacement, addition, omission, and the like. Each exemplary embodiment may be combined.

For example, while in the first and second exemplary embodiments, the user specifies the corresponding point area including an easily identified point in the display and input in the case of the abnormality detector determining the three-dimensional coordinates of the target point to be abnormal, the user may specify the corresponding point area from an initial stage of generating the three-dimensional coordinates of the target point without determining the presence or absence of abnormality in the three-dimensional coordinates. Accordingly, cases that lead to a result of determining the three-dimensional coordinates of the target point to be abnormal are assumed to be reduced.

A three-dimensional information reconstraction device of the first and second exemplary embodiments includes an image acquirer, an area specifier, a corresponding point detector, and a three-dimensional coordinate deriver. The image acquirer acquires a first image captured by a first image capturing device and a second image captured by a second image capturing device. The area specifier specifies a first area in the first image and a second area corresponding to the first area in the second image. The corresponding point detector detects a plurality of first corresponding point pairs to which a first feature point included in the first area and a second feature point included in the second area correspond. The three-dimensional coordinate deriver, based on the plurality of first corresponding point pairs, reconstructs three-dimensional coordinates to which the first feature point is inverse-projected.

The three-dimensional information reconstraction device is, for example, PC 20. The first image capturing device is, for example, first camera 10. The second image capturing device is, for example, second camera 11. The image acquirer is, for example, feature point extractor 21. The area specifier is, for example, display and input 26. Corresponding point detector is, for example, narrow area corresponding point detector 27. The three-dimensional coordinate deriver is, for example, three-dimensional coordinate calculator 24. The first area is, for example, corresponding point area 26y1. The second area is, for example, corresponding point area 26y2.

Accordingly, the three-dimensional information reconstraction device can specify an area for detection of corresponding points used at the time of three-dimensional information reconstraction. Therefore, the three-dimensional information reconstraction device can accurately detect the corresponding point pair information by using a feature point in the specified area, compared with the case of causing an information processing apparatus to perform all processing such as corresponding point detection without a user operation. Thus, the three-dimensional information reconstraction device can improve reconstraction accuracy for the three-dimensional coordinates calculated by using the corresponding point pair information.

In the three-dimensional information reconstraction device, a parameter deriver derives a plurality of parameters for derivation of the three-dimensional coordinates based on the plurality of first corresponding point pairs. An abnormality determiner determines the presence or absence of abnormality in the restored three-dimensional coordinates based on the derived plurality of parameters. The area specifier specifies the first area and the second area in the case of the three-dimensional coordinates being abnormal.

Accordingly, in the case of the three-dimensional coordinates being determined to be abnormal, the three-dimensional information reconstraction device can support normalization of the three-dimensional coordinates by assisting with simple area specification using information acquired in the previously performed operation for reconstraction of the three-dimensional coordinates determined to be abnormal. The three-dimensional information reconstraction device, even if extraction accuracy for feature point extraction or detection accuracy for corresponding point detection is not sufficient, complements insufficiency of the accuracy by specifying the corresponding point area and can improve reconstraction accuracy for the three-dimensional coordinates.

The three-dimensional information reconstraction device may include a feature point storage and a feature point extractor. The feature point storage stores the first feature point and the second feature point detected as the first corresponding point pair. The feature point extractor extracts a plurality of third feature points included in a third image captured by the first image capturing device and a plurality of fourth feature points included in a fourth image captured by the second image capturing device. The corresponding point detector may detect a third area corresponding to the first area in the third image and a fourth area corresponding to the second area in the fourth image based on a correspondence of the first feature and the second feature point stored in the feature point storage with the third feature point and the fourth feature point extracted by the feature point extractor. The corresponding point detector may detect a plurality of second corresponding point pairs to which the third feature point included in the third area and the fourth feature point included in the fourth area correspond. The three-dimensional coordinate deriver, based on the plurality of second corresponding point pairs, may restore three-dimensional coordinates to which the third feature point is inverse-projected.

The feature point storage is, for example, feature point group retainer 28. The feature point extractor is, for example, feature point extractor 21. The third area is, for example, corresponding point area 56$y1$. The fourth area is, for example, corresponding point area 56$y2$.

Accordingly, in the case of respecifying the corresponding point areas such as at the time of calibration after initial setting, the corresponding point area can be detected by using the first feature point and the second feature point used in the past. Therefore, the effort of the user respecifying the corresponding point area is reduced, and operation is simplified. Operation such as calibration can be simplified.

The three-dimensional information reconstraction device may include an input (for example, input device 20M) receiving an input operation and a display (for example, display 20L) displaying the first image and the second image.

The area specifier may specify the first area and the second area in accordance with the input operation by the input performed for the first image and the second image displayed on the display. The display may display the first area and the second area specified by the area specifier.

Accordingly, the user, for example, can directly specify the corresponding point area to enclose, for example, an easily identified point, while viewing the first image and the second image. The user can display the first image and the second image on the display and specify the first area and the second area with an input operation by the input in an overlaid manner on the images. Therefore, a user interface that is intuitively easy to understand with a simple operation can be provided.

A three-dimensional information reconstraction system includes the first image capturing device capturing the first image, the second image capturing device capturing the second image, and the three-dimensional information reconstraction device reconstructing the three-dimensional coordinates based on the first image and the second image.

Accordingly, the three-dimensional information reconstraction device can specify an area for detection of corresponding points used at the time of three-dimensional information reconstruction. Therefore, the three-dimensional information reconstraction device can accurately detect the corresponding point pair information by using a feature point in the specified area, compared with the case of causing an information processing apparatus to perform all processing such as corresponding point detection without a user operation. Thus, the three-dimensional information reconstraction device can improve reconstraction accuracy for the three-dimensional coordinates calculated by using the corresponding point pair information.

The three-dimensional information reconstraction system may include a sender acquiring the first image from the first image capturing device, acquiring the second image from the second image capturing device, and sending the first image and the second image and a receiver receiving the first image and the second image from the sender and sending the first image and the second image to the three-dimensional information reconstraction device. The sender is, for example, sender 63, and the receiver is, for example, receiver 72.

Accordingly, calibration and the like can be performed in a location far away from the installation locations of the first image capturing device and the second image capturing device, and the three-dimensional information reconstraction system can be efficiently operated.

Furthermore, PC 20 may extract and display a candidate area of one or more corresponding points in the second image by using the amount of features in the corresponding point area that is specified in the first image by an operator (user) through the input or the like. The corresponding point area in the second image corresponding to the corresponding point area specified in the first image is highly likely to be in the displayed candidate area of corresponding points. The corresponding point area in the second image corresponding to the corresponding point area specified in the first image, in the case of being in the displayed candidate area of corresponding points, may be selected and specified from the displayed candidate area of corresponding points by the operator through the input or the like. That is, the operator can more simply specify the corresponding point area in the second image that truly corresponds to the corresponding point area specified in the first image.

While the third and fourth exemplary embodiments illustrate one example of calibration by using FIG. 17 and FIG. 22, calibration may be performed by including processing other than the processing illustrated in FIG. 17 and FIG. 22.

Figure 26:
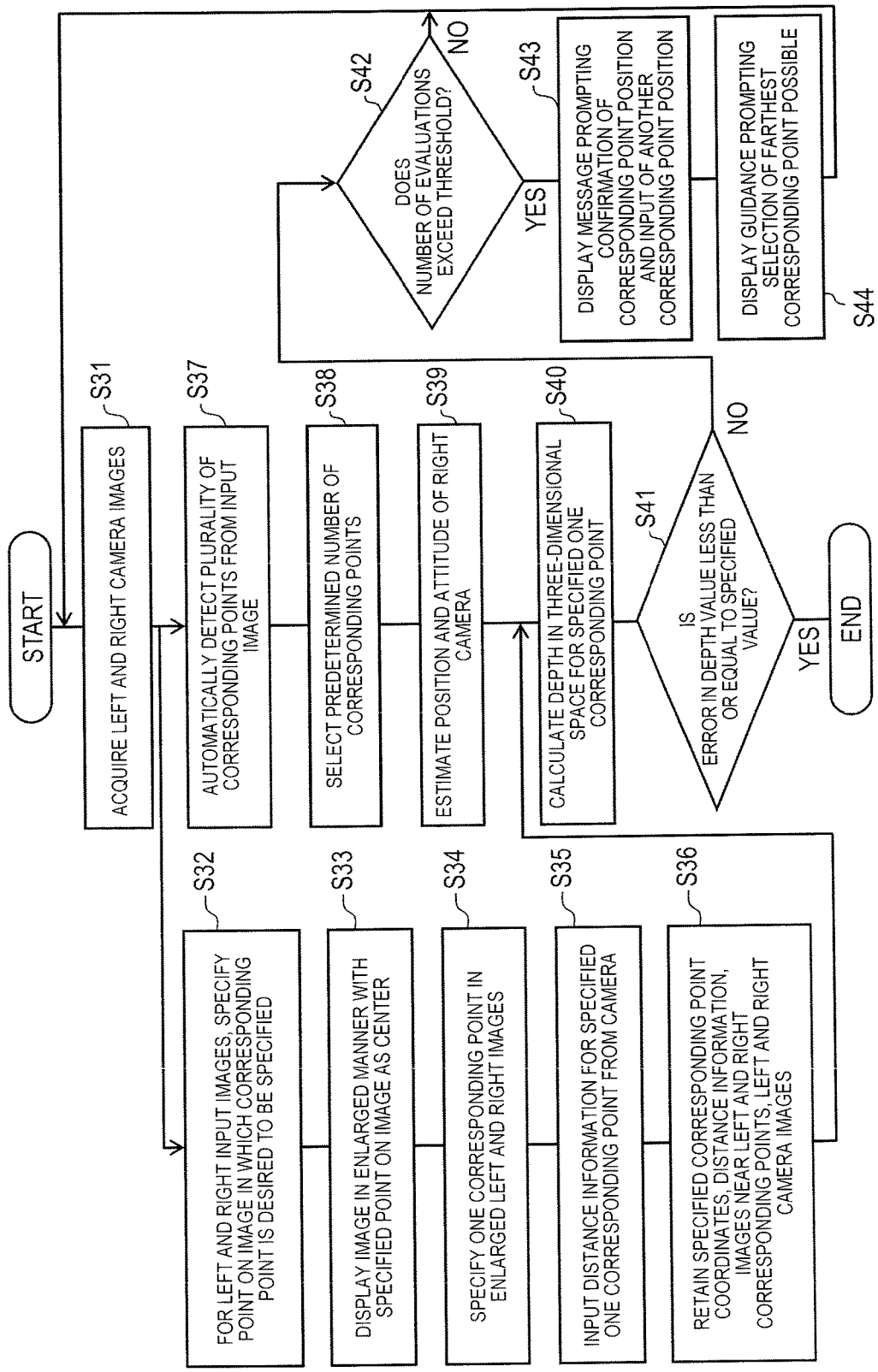
FIG. 26 is a flowchart illustrating another example of initial calibration performed at the time of initial setting.
Figure 27:
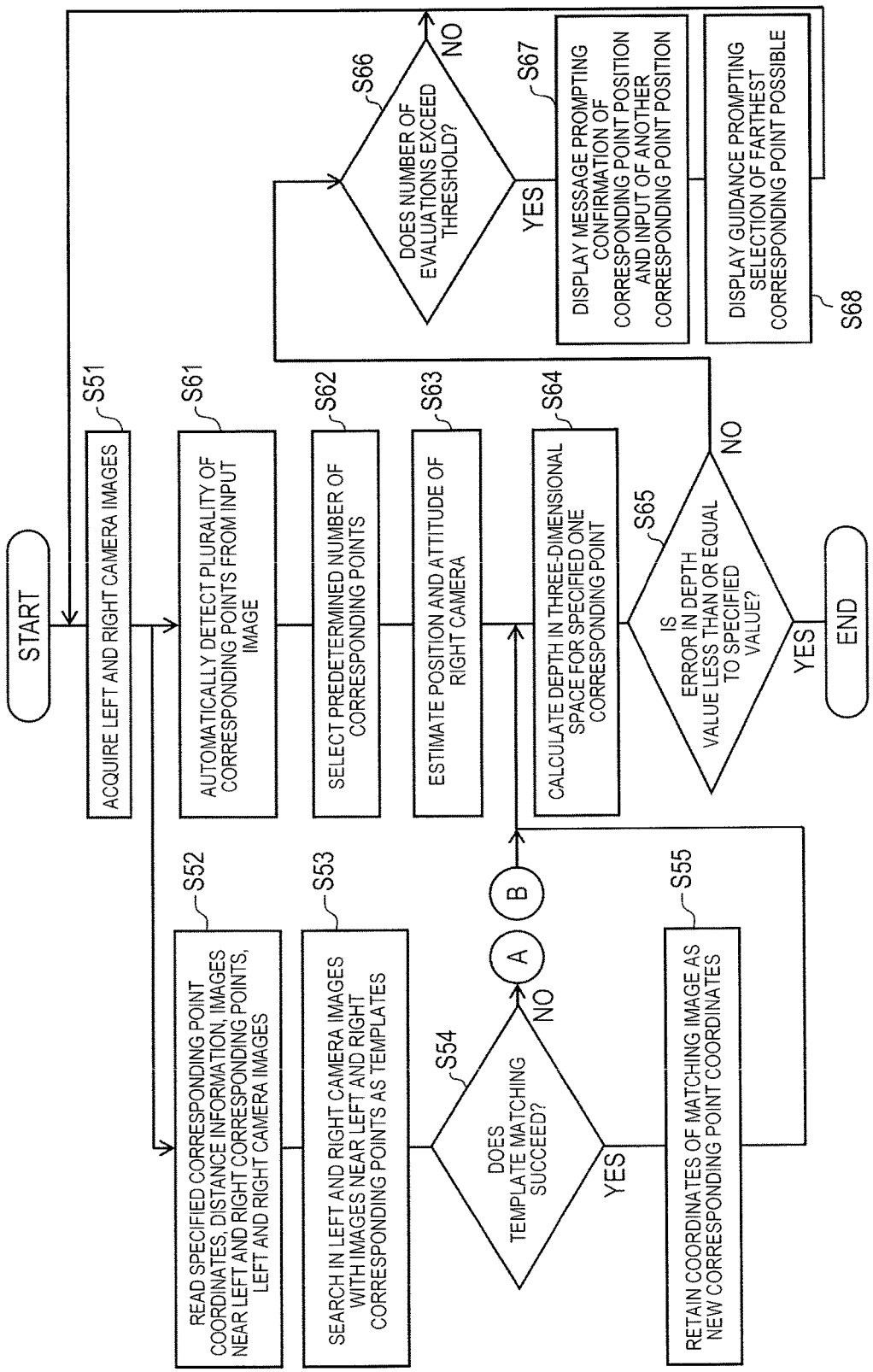
FIG. 27 is a flowchart illustrating another example of recalibration performed at the time of operation.

FIG. 26 is a flowchart illustrating another example of initial calibration performed at the time of initial setting. FIG. 27 is a flowchart illustrating another example of recalibration performed at the time of operation.

In FIG. 26, in the case of the number of accuracy evaluations not exceeding the threshold in S42, processor 30C proceeds to S31 and reacquires the image data of first image GZ1 and second image GZ2. After the process of S44, processor 30C proceeds to S31 and reacquires the image data of first image GZ1 and second image GZ2.

In FIG. 27, in the case of the number of accuracy evaluations not exceeding the threshold in S66, processor 30D proceeds to S51 and reacquires the image data of first image GZ1 and second image GZ2. After the process of S68, processor 30D proceeds to S51 and reacquires the image data of first image GZ1 and second image GZ2.

Accordingly, PCs 20C and 20D can acquire a plurality of pieces of image data having difference in image capturing time by reacquiring the image data. The difference in time of the image capturing time, for example, changes a bright area or a dark area in the captured images and changes feature points in each captured image. Change of the feature points changes the corresponding points and also changes the result of pose estimation.

Thus, having difference in image capturing time of the acquired plurality of pieces of image data appropriately adds time-direction variations to the captured images. Accordingly, PC 20C and 20D can improve estimation accuracy for estimation of the position and the pose of second camera 11 with respect to first camera 10. In FIG. 26 and FIG. 27, the specified corresponding points may not be changed in the case of reacquisition of the image data.

The third and fourth exemplary embodiments illustrate processors 30C and 30D as performing accuracy evaluation based on one specified corresponding point and the calculated corresponding point. Instead, processors 30C and 30D may perform accuracy evaluation based on a plurality (for example, two or three) of specified corresponding points and a plurality of calculated corresponding points. In this case, accuracy evaluation is more accurate by using the plurality of corresponding points.

The third and fourth exemplary embodiments illustrate using the depth value (that is, the Z coordinate value) corresponding to the specified corresponding point as the distance information to the target point. Instead, evaluation may be performed by using, as the distance information from a camera to the target point, a distance that is represented by the square root of the sum of the squares of the values of the X coordinate, the Y coordinate, and the Z coordinate. Accordingly, the case of having difficulty in acquisition of the actual measured value of the Z coordinate of the target point such as the target point being significantly separated in the X-coordinate or Y-coordinate direction from a camera can be handled.

The fourth exemplary embodiment illustrates PC 20D as acquiring the specified corresponding point by template matching of both of the first image and the second image at the time of recalibration. Instead, for example, in the case of any one of the first image and the second image being apparently determined to be shifted, processor 30D may acquire the specified corresponding point by using the image that is determined to be shifted. Processors 30C and 30D may perform the three-dimensional reconstraction processing by using the acquired specified corresponding point and the specified corresponding point of another image in initial calibration (or previous recalibration). PC 20D may acquire the specified corresponding point by image processing other than template matching.

The third and fourth exemplary embodiments illustrate first camera 10 and second camera 11 as being configured to be directly connected to PCs 20C and 20D through cables 18A and 18B. Instead, a sender and a receiver may be disposed between first camera 10 and second camera 11 and PCs 20C and 20D, and data and signals may be configured to be communicated by communication using the sender and the receiver. Accordingly, the first camera and the second camera can be installed in a remote location, and the PC that is installed in a separate location can perform the three-dimensional reconstraction processing.

In the third exemplary embodiment, the processor may have any physical configuration. If a programmable processor is used, a processing content can be changed by changing the program. Thus, the design degree of freedom of the processor can be increased. The processor may be configured of one semiconductor chip or may be physically configured of a plurality of semiconductor chips. In the case of configuring the processor of a plurality of semiconductor chips, each control of the third and fourth exemplary embodiment may be realized by different semiconductor chips. In this case, one processor can be considered to be configured of the plurality of semiconductor chips. The processor may be configured of a member (a capacitor or the like) that has different function from the semiconductor chip. One semiconductor chip may be configured to realize the function of the processor and another function.

INDUSTRIAL APPLICABILITY

The present disclosure is useful for a three-dimensional information reconstraction device, a three-dimensional information reconstraction system, a three-dimensional information reconstraction method, and the like that can improve reconstraction accuracy for three-dimensional coordinates restored from two captured images.

REFERENCE MARKS IN THE DRAWINGS 5, 5A, 5B, 5C, 5D stereocamera system
10 first camera
11 second camera
13 first casing
14 second casing
18A, 18B, 18C cable
20, 20A, 20B, 20C, 20D PC
20L display
20M input device
21 feature point extractor
22 corresponding point detector
23 camera parameter estimator
24 three-dimensional coordinate calculator
25 abnormality detector
26 display and input
26$e$, 26$f$ start button
26$g$ OK button
26$h$ NG button
26$m$, c1 to c7 correspondence line
26$y$1, 26$y$2, 56$y$1, 56$y$2 corresponding point area 26z cursor
27 narrow area corresponding point detector
28 feature point group retainer
29 accuracy evaluator
30, 30A, 30B, 30C, 30D processor
31 memory
32 port
33, 33A first image
36, 36A second image
38a, 38b, a, a1 to a7, b, b1 to b7 feature point
39a, 39b, 58a, 58b, a11 to a15, b11 to b15 corresponding point
40 target object (subject)
41, 41A target point
35 reader
36 position searcher
51, 52 feature point group
61 image acquisition device
62 baseline length
63 sender
65 dedicated line
72 receiver
am, bm corresponding point that is specified (specified corresponding point)
c1 to c7, cm correspondence line
fr1, fr2 frame
g, h dotted-line frame
G1 to G5, G11 to G14 screen
GZ1, GZ3 first image
GZ2, GZ4 second image
GZ11, GZ12 peripheral image
MK mark
ms1 error message
ms2, ms3 guidance
pf1, pf2 rectangular frame
PGZ3, PGZ4 area image
SL cursor.

The invention claimed is:

1. A three-dimensional information reconstruction device comprising:
a port, wherein the port acquires a first image captured by a first camera, and further acquires a second image captured by a second camera;
a processor, wherein the processor
detects a plurality of first corresponding point pairs to which a first feature point in the first image and a second feature point in the second image correspond, and
based on the plurality of first corresponding point pairs, reconstructs three-dimensional coordinates to which the first feature point is inverse-projected;
an input that, with any corresponding point pair included in the plurality of first corresponding point pairs as a specified corresponding point pair, inputs position information indicating the position of the specified corresponding point pair in each of the first image and the second image and distance information indicating the distance from the first camera to the specified corresponding point pair;
a display that, under control of the processor, displays a candidate of the specified corresponding point pair included in the plurality of first corresponding point pairs in at least one of the first image and the second image, wherein:
the processor recalculates reconstruction of the three-dimensional coordinates after input of the position information and the distance information, and
the display, under control of the processor, displays guide information, in any of the first image or the second image, that prompts input of the position information as the position of the specified corresponding point pair by prioritizing a position having a farthest distance from the first camera.

2. The three-dimensional information reconstruction device of claim 1,
wherein the processor determines whether or not to recalculate reconstruction of the three-dimensional coordinates based on the distance information input by the input and information of the distance from the first camera to the specified corresponding point pair acquired by reconstruction of the three-dimensional coordinates.

3. The three-dimensional information reconstruction device of claim 2,
wherein the display, under control of the processor, displays alert information related to input of the specified corresponding point pair in a case of the difference between the distance information input by the input and the information of the distance from the first camera to the specified corresponding point pair acquired by reconstruction of the three-dimensional coordinates being greater than or equal to a predetermined value.

4. The three-dimensional information reconstruction device of claim 1,
wherein the processor performs reconstruction processing including reconstruction of the three-dimensional coordinates a plurality of number of times,
in first reconstruction processing,
retains, in a memory, the position information of the specified corresponding point pair input by the input, the distance information, and a third image that includes the specified corresponding point pair in the first image captured by the first camera in the first reconstruction processing, and
in second reconstruction processing subsequent to the first reconstruction processing,
detects an area corresponding to the third image in the first image captured by the first camera in the second reconstruction processing,
sets, to a specified corresponding point pair in the second reconstruction processing, the first corresponding point pair acquired in the reconstruction processing that is included in the area and corresponds to the specified corresponding point pair acquired in the first reconstruction processing, and
recalculates reconstruction of the three-dimensional coordinates after setting the specified corresponding point pair.

5. The three-dimensional information reconstruction device of claim 4, further comprising:
a display,
wherein the display, under control of the processor, displays the position information of the specified corresponding point pair and the third image retained in the memory in a case of an area corresponding to the third image in the first image not being detected in the second reconstruction processing or in a case of the difference between the distance information retained in the memory and information of the distance from the first camera to the specified corresponding point pair acquired by the second reconstruction processing being greater than or equal to a predetermined value.

6. The three-dimensional information reconstruction device of claim 5, wherein the display displays guide information that prompts input of the position information of the specified corresponding point pair in the first image in the second reconstruction processing by referencing the position information of the specified corresponding point pair and the third image retained in the memory.

7. The three-dimensional information reconstruction device of claim 1, further comprising:
an area specifier that specifies a first area in the first image and a second area corresponding to the first area in the second image;
a parameter deriver that derives a plurality of parameters for derivation of the three-dimensional coordinates based on the plurality of first corresponding point pairs; and
an abnormality determiner that determines presence or absence of abnormality in the three-dimensional coordinates restored by the processor based on the plurality of parameters derived by the parameter deriver,
wherein the first feature point is included in the first area, the second feature point is included in the second area, and a corresponding point detector that detects the plurality of first corresponding point pairs to which the first feature point and the second feature point correspond is further included, and
the area specifier specifies the first area and the second area in a case of the three-dimensional coordinates being abnormal.

8. The three-dimensional information reconstruction device of claim 7, further comprising:
a feature point storage that stores the first feature point and the second feature point detected as the first corresponding point pair; and
a feature point extractor that extracts, a plurality of number of times, a third feature point included in a third image captured by the first camera and a fourth feature point included in a fourth image captured by the second camera,
wherein the corresponding point detector
detects a third area corresponding to the first area in the third image and a fourth area corresponding to the second area in the fourth image based on a correspondence of the first feature point and the second feature point stored in the feature point storage with the third feature point and the fourth feature point extracted by the feature point extractor, and
detects a plurality of second corresponding point pairs to which the third feature point included in the third area and the fourth feature point included in the fourth area correspond, and
the processor, based on the plurality of second corresponding point pairs, reconstructs three-dimensional coordinates to which the third feature point is inverse-projected.

9. The three-dimensional information reconstruction device of claim 7, further comprising:
an input that receives an input operation; and
a display that displays the first image and the second image,
wherein the area specifier specifies the first area and the second area in accordance with an input operation by the input that is performed for the first image and the second image displayed on the display, and
the display displays the first area and the second area specified by the area specifier.

10. A three-dimensional information reconstruction system comprising:

a first camera that captures a first image;
a second camera that captures a second image; and
a three-dimensional information reconstructor that reconstructs three-dimensional coordinates based on the first image and the second image, wherein the three-dimensional information reconstruction device comprises:
a port, wherein the port acquires a first image captured by a first camera and a second image captured by a second camera,
a processor, wherein the processor
detects a plurality of first corresponding point pairs to which a first feature point in the first image and a second feature point in the second image correspond, and
based on the plurality of first corresponding point pairs, reconstructs three-dimensional coordinates to which the first feature point is inverse-projected
an input that, with any corresponding point pair included in the plurality of first corresponding point pairs as a specified corresponding point pair, inputs position information indicating the position of the specified corresponding point pair in each of the first image and the second image and distance information indicating the distance from the first camera to the specified corresponding point pair;
a display that, under control of the processor, displays a candidate of the specified corresponding point pair included in the plurality of first corresponding point pairs in at least one of the first image and the second image, wherein:
the processor recalculates reconstruction of the three-dimensional coordinates after input of the position information and the distance information, and
the display, under control of the processor, displays guide information, in any of the first image or the second image, that prompts input of the position information as the position of the specified corresponding point pair by prioritizing a position having a farthest distance from the first camera.

11. The three-dimensional information reconstruction system of claim 10, further comprising:
a transmitter that acquires the first image from the first camera, acquires the second image from the second camera, and sends the first image and the second image; and
a receiver that receives the first image and the second image from the transmitter and sends the first image and the second image to the three-dimensional information reconstructor.

12. A three-dimensional information reconstruction method in a three-dimensional information reconstruction device, the method comprising:
acquiring a first image captured by a first image capturing device and a second image captured by a second image capturing device;
detecting a plurality of first corresponding point pairs to which a first feature point in the first image and a second feature point in the second image correspond;
based on the plurality of first corresponding point pairs, reconstructing three-dimensional coordinates to which the first feature point is inverse-projected;
with any corresponding point pair included in the plurality of first corresponding point pairs as a specified corresponding point pair, inputting position information indicating the position of the specified corresponding point pair in each of the first image and the second image and distance information indicating the distance from the first image capturing device to the specified corresponding point pair;

displaying on a display a candidate of the specified corresponding point pair included in the plurality of first corresponding point pairs in at least one of the first image and the second image;

recalculating reconstruction of the three-dimensional coordinates after input of the position information and the distance information, and displaying, on the display, guide information, in any of the first image or the second image, that prompts input of the position information as the position of the specified corresponding point pair by prioritizing a position having a farthest distance from the first image capturing device.

* * * * *